(12) United States Patent
Chawla et al.

(10) Patent No.: US 11,216,738 B2
(45) Date of Patent: *Jan. 4, 2022

(54) COGNITIVE ATTRIBUTION

(71) Applicant: Cognitive Scale, Inc., Austin, TX (US)

(72) Inventors: Neeraj Chawla, Austin, TX (US); Matthew Sanchez, Austin, TX (US); Andrea M. Ricaurte, Austin, TX (US); Dilum Ranatunga, Austin, TX (US); Ayan Acharya, Austin, TX (US); Hannah R. Lindsley, Austin, TX (US)

(73) Assignee: Cognitive Scale, Inc., Austin, TX (US)

( * ) Notice: Subject to any disclaimer, the term of this patent is extended or adjusted under 35 U.S.C. 154(b) by 24 days.

This patent is subject to a terminal disclaimer.

(21) Appl. No.: 16/855,021

(22) Filed: Apr. 22, 2020

(65) Prior Publication Data
US 2020/0387808 A1    Dec. 10, 2020

Related U.S. Application Data

(63) Continuation of application No. 15/714,325, filed on Sep. 25, 2017, now Pat. No. 10,643,139.
(Continued)

(51) Int. Cl.
*G06K 9/00* (2006.01)
*G06N 5/04* (2006.01)
(Continued)

(52) U.S. Cl.
CPC ............... *G06N 5/04* (2013.01); *G06F 16/36* (2019.01); *G06F 16/5854* (2019.01);
(Continued)

(58) Field of Classification Search
CPC .......... G06N 5/04; G06N 5/043; G06N 5/022; G06N 20/00; G06N 5/041; G06F 16/5854;
(Continued)

(56) References Cited

U.S. PATENT DOCUMENTS 10,410,273 B1    9/2019  Finkelstein et al.
2013/0159236 A1  6/2013  Vladislav et al.
(Continued)

FOREIGN PATENT DOCUMENTS

CN    102436583 A    5/2012

OTHER PUBLICATIONS

Schiaffino, Silvia et al., Intelligent User Profiling, Artificial Intelligence an International Perspective, Springer, Berlin, Heidelberg, 2009, pp. 193-216.
(Continued)

*Primary Examiner* — Ping Y Hsieh
(74) *Attorney, Agent, or Firm* — Terrile, Cannatti & Chambers; Stephen A. Terrile

(57) ABSTRACT

A method, system and computer readable medium for generating a cognitive insight comprising: receiving content element data, the content element data representing a content element, the content element comprising an element of a corpus of content; performing a cognitive learning operation on the content element data, the cognitive learning operation identifying descriptive information associated with the content element; associating a cognitive attribute with the content element using the descriptive information associated with the content element.

20 Claims, 19 Drawing Sheets

Related U.S. Application Data

(60) Provisional application No. 62/487,844, filed on Apr. 20, 2017.

(51) Int. Cl.

| | | |
|---|---|---|
| *G06N 5/02* | (2006.01) | |
| *G06T 7/11* | (2017.01) | |
| *G06K 9/66* | (2006.01) | |
| *G06F 16/954* | (2019.01) | |
| *G06F 16/957* | (2019.01) | |
| *G06F 16/9535* | (2019.01) | |
| *G06F 16/583* | (2019.01) | |
| *G06F 16/36* | (2019.01) | |
| *G06N 20/00* | (2019.01) | |
| *G06F 16/242* | (2019.01) | |

(52) U.S. Cl.
CPC ......... *G06F 16/954* (2019.01); *G06F 16/957* (2019.01); *G06F 16/9535* (2019.01); *G06K 9/66* (2013.01); *G06N 5/022* (2013.01); *G06N 5/043* (2013.01); *G06T 7/11* (2017.01); *G06F 16/243* (2019.01); *G06N 20/00* (2019.01)

(58) Field of Classification Search
CPC ...... G06F 16/36; G06F 16/954; G06F 16/957; G06F 16/9535; G06F 16/243; G06T 7/11; G06K 9/66
See application file for complete search history.

(56) References Cited

U.S. PATENT DOCUMENTS

| | | | |
|---|---|---|---|
| 2014/0067368 A1 | 3/2014 | Yih et al. | |
| 2014/0372951 A1 | 12/2014 | Li et al. | |
| 2015/0324434 A1 | 11/2015 | Greenwood et al. | |
| 2015/0356144 A1 | 12/2015 | Chawla et al. | |
| 2017/0091628 A1* | 3/2017 | Nachman | G06F 16/9535 |
| 2017/0116728 A1* | 4/2017 | Codella | G06T 7/143 |
| 2017/0329983 A1* | 11/2017 | Grant | G06F 16/435 |
| 2017/0364519 A1* | 12/2017 | Beller | G06N 7/005 |
| 2018/0052884 A1* | 2/2018 | Kale | G06F 16/24578 |
| 2018/0052885 A1* | 2/2018 | Gaskill | G06N 5/022 |
| 2018/0101550 A1* | 4/2018 | Calcaterra | G06K 9/00671 |
| 2018/0204083 A1* | 7/2018 | Goyal | G06F 16/5854 |
| 2018/0232399 A1* | 8/2018 | Goyal | G06K 9/6267 |
| 2018/0267977 A1* | 9/2018 | Bandyopadhyay | G06F 16/3347 |
| 2018/0300046 A1* | 10/2018 | Goyal | G06F 3/04847 |

OTHER PUBLICATIONS

List of Patents or Applications Treated as Related, 2020.

* cited by examiner

Description 808

From Julia Sandel's exclusive 'Chimera' collection, this dress is a perfect option for <u>formal</u> occasions. In elegant midnight <u>blue</u>, the <u>chiffon</u> skirt drapes beautifully for a flattering silhouette while the <u>off-the-shoulder low neckline</u> adds a touch of <u>vintage</u>-inspired glamour. It is finished with fine <u>frill detailing on the skirt and a satin sash.</u>

Reviews (2/17)   810
★★★★★   07 June 2016
Stunning!
galapartygirl from Jersey This dress is stunning and very <u>elegant</u>. It isn't too low at the <u>front</u>, but still enough to be <u>sexy</u>. It's very similar to the outfit Jenny Kay wore to the Emmy awards this year, although it has a <u>satin sash</u> and a <u>ruffled detail at the waist</u>. Can't wait to wear it to the next formal event! I ordered my usual <u>size 10</u>, as I have <u>curves</u>, and it fits perfectly. While it's long, I'm <u>5'9"</u> and with <u>high heels</u> it's the perfect length.

Cognitive Attributes 812

Styles: *flowy, formal, figure-flattering, elegant, vintage, glamorous*

Length: *floor*

Sleeves: *off-the-shoulder*

Color: *dark blue*

Material: *chiffon*

Features: *strapless, low neckline, risque, sexy, off-the-shoulder, sheer overlay*

Embellishments: *satin sash, ruffled waist, bodice darts, skirt frills*

Accessories: *high heels*

Body Shape: *hourglass, athletic*

Occasions: *evenings, fundraisers, galas, special occasions*

806 Content Element Image

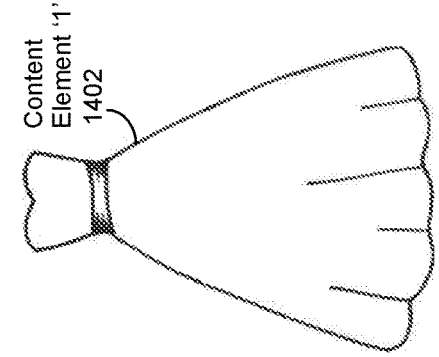
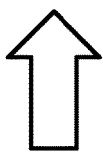
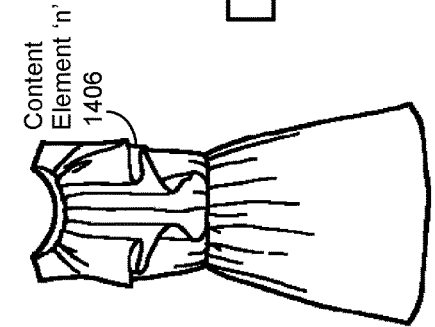
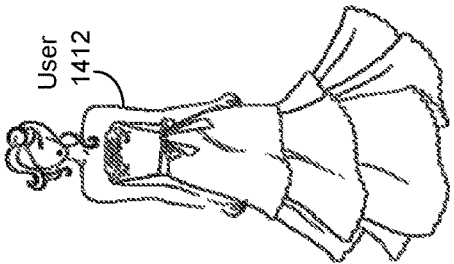
Figure 14

Figure 16

COGNITIVE ATTRIBUTION

BACKGROUND OF THE INVENTION

Field of the Invention

The present invention relates in general to the field of computers and similar technologies, and in particular to software utilized in this field. Still more particularly, it relates to a method, system and computer-usable medium for performing a cognitive attribution operation.

Description of the Related Art

In general, "big data" refers to a collection of datasets so large and complex that they become difficult to process using typical database management tools and traditional data processing approaches. These datasets can originate from a wide variety of sources, including computer systems, mobile devices, credit card transactions, television broadcasts, and medical equipment, as well as infrastructures associated with cities, sensor-equipped buildings and factories, and transportation systems. Challenges commonly associated with big data, which may be a combination of structured, unstructured, and semi-structured data, include its capture, curation, storage, search, sharing, analysis and visualization. In combination, these challenges make it difficult to efficiently process large quantities of data within tolerable time intervals.

Nonetheless, big data analytics hold the promise of extracting insights by uncovering difficult-to-discover patterns and connections, as well as providing assistance in making complex decisions by analyzing different and potentially conflicting options. As such, individuals and organizations alike can be provided new opportunities to innovate, compete, and capture value.

One aspect of big data is "dark data," which generally refers to data that is either not collected, neglected, or underutilized. Examples of data that is not currently being collected includes location data prior to the emergence of companies such as Foursquare or social data prior to the advent companies such as Facebook. An example of data that is being collected, but is difficult to access at the right time and place, includes data associated with the side effects of certain spider bites while on a camping trip. As another example, data that is collected and available, but has not yet been productized of fully utilized, may include disease insights from population-wide healthcare records and social media feeds. As a result, a case can be made that dark data may in fact be of higher value than big data in general, especially as it can likely provide actionable insights when it is combined with readily-available data.

SUMMARY OF THE INVENTION

In one embodiment, the invention relates to a method for performing a cognitive attribution operation comprising: receiving content element data, the content element data representing a content element, the content element comprising an element of a corpus of content; performing a cognitive learning operation on the content element data, the cognitive learning operation identifying descriptive information associated with the content element; associating a cognitive attribute with the content element using the descriptive information associated with the content element.

In another embodiment, the invention relates to a system comprising: a processor; a data bus coupled to the processor; and a non-transitory, computer-readable storage medium embodying computer program code, the non-transitory, computer-readable storage medium being coupled to the data bus. The computer program code interacting with a plurality of computer operations and comprising instructions executable by the processor and configured for: receiving content element data, the content element data representing a content element, the content element comprising an element of a corpus of content; performing a cognitive learning operation on the content element data, the cognitive learning operation identifying descriptive information associated with the content element; associating a cognitive attribute with the content element using the descriptive information associated with the content element.

In another embodiment, the invention relates to a non-transitory, computer-readable storage medium embodying computer program code, the computer program code comprising computer executable instructions configured for: receiving content element data, the content element data representing a content element, the content element comprising an element of a corpus of content; performing a cognitive learning operation on the content element data, the cognitive learning operation identifying descriptive information associated with the content element; associating a cognitive attribute with the content element using the descriptive information associated with the content element.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 8 shows the display of a content element image, related descriptive information, and corresponding cognitive attributes within a user interface (UI);

FIG. 14 is a simplified block diagram of the generation of a cognitive profile from cognitive attributes;

FIG. 16 shows the display of content elements pertinent to a particular user's affinities within a UI.

DETAILED DESCRIPTION

Figure 1:
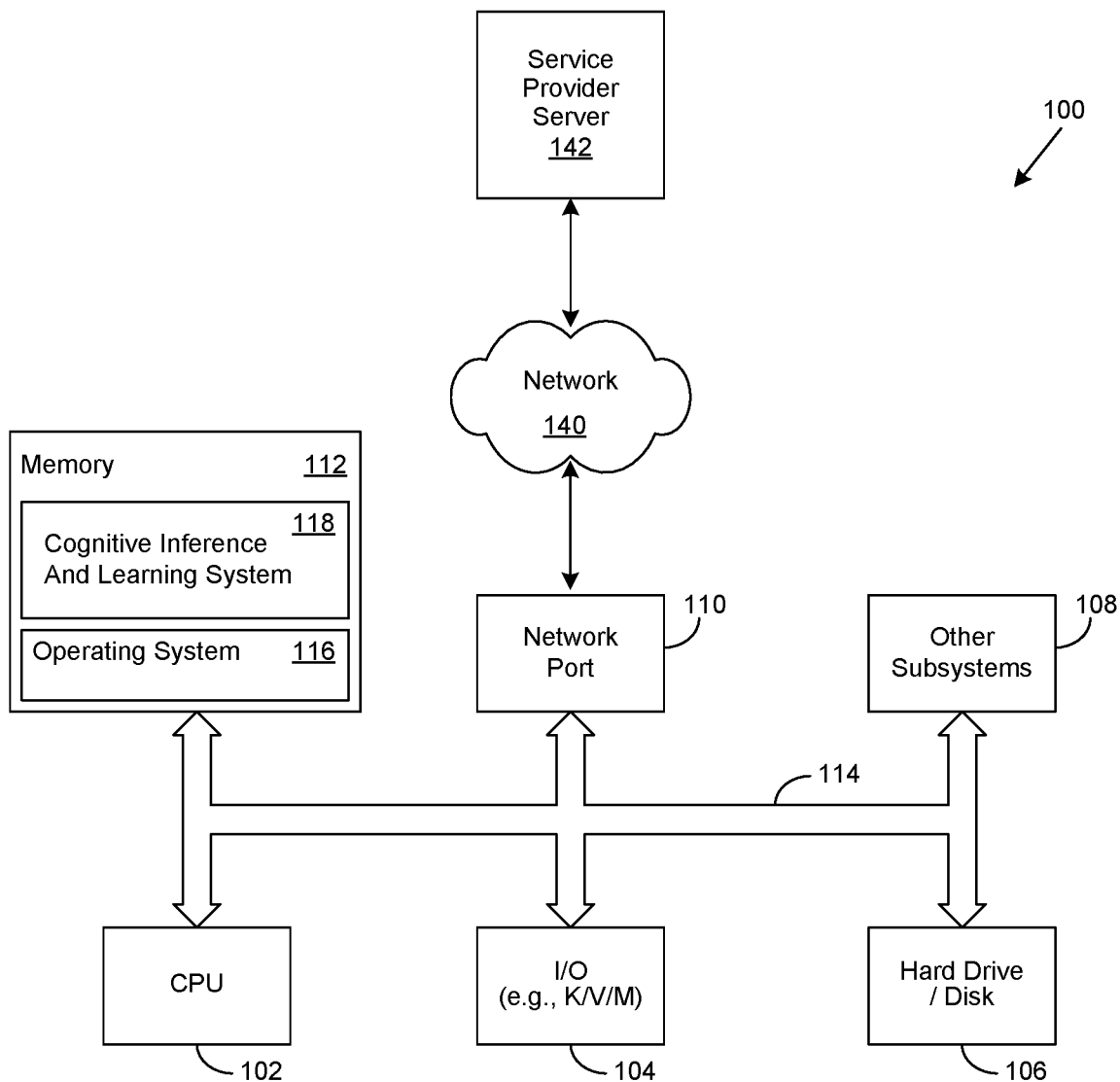
FIG. 1 depicts an exemplary client computer in which the present invention may be implemented.

A method, system and computer-usable medium are disclosed for cognitive inference and learning operations. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 is a generalized illustration of an information processing system 100 that can be used to implement the system and method of the present invention. The information processing system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information processing system 100 also includes network port 110 operable to connect to a network 140, which is likewise accessible by a service provider server 142. The information processing system 100 likewise includes system memory 112, which is interconnected to the foregoing via one or more buses 114. System memory 112 further comprises operating system (OS) 116 and in various embodiments may also comprise cognitive inference and learning system (CILS) 118. In these and other embodiments, the CILS 118 may likewise comprise invention modules 120. In one embodiment, the information processing system 100 is able to download the CILS 118 from the service provider server 142. In another embodiment, the CILS 118 is provided as a service from the service provider server 142.

In various embodiments, the CILS 118 is implemented to perform various cognitive computing operations described in greater detail herein. As used herein, cognitive computing broadly refers to a class of computing involving self-learning systems that use techniques such as spatial navigation, machine vision, and pattern recognition to increasingly mimic the way the human brain works. To be more specific, earlier approaches to computing typically solved problems by executing a set of instructions codified within software. In contrast, cognitive computing approaches are data-driven, sense-making, insight-extracting, problem-solving systems that have more in common with the structure of the human brain than with the architecture of contemporary, instruction-driven computers.

To further differentiate these distinctions, traditional computers must first be programmed by humans to perform specific tasks, while cognitive systems learn from their interactions with data and humans alike, and in a sense, program themselves to perform new tasks. To summarize the difference between the two, traditional computers are designed to calculate rapidly. Cognitive systems are designed to quickly draw inferences from data and gain new knowledge.

Cognitive systems achieve these abilities by combining various aspects of artificial intelligence, natural language processing, dynamic learning, and hypothesis generation to render vast quantities of intelligible data to assist humans in making better decisions. As such, cognitive systems can be characterized as having the ability to interact naturally with people to extend what either humans, or machines, could do on their own. Furthermore, they are typically able to process natural language, multi-structured data, and experience much in the same way as humans. Moreover, they are also typically able to learn a knowledge domain based upon the best available data and get better, and more immersive, over time.

It will be appreciated that more data is currently being produced every day than was recently produced by human beings from the beginning of recorded time. Deep within this ever-growing mass of data is a class of data known as "dark data," which includes neglected information, ambient signals, and insights that can assist organizations and individuals in augmenting their intelligence and deliver actionable insights through the implementation of cognitive applications. As used herein, cognitive applications, or "cognitive apps," broadly refer to cloud-based, big data interpretive applications that learn from user engagement and data interactions. Such cognitive applications extract patterns and insights from dark data sources that are currently almost completely opaque. Examples of such dark data include disease insights from population-wide healthcare records and social media feeds, or from new sources of information, such as sensors monitoring pollution in delicate marine environments.

Over time, it is anticipated that cognitive applications will fundamentally change the ways in which many organizations operate as they invert current issues associated with data volume and variety to enable a smart, interactive data supply chain. Ultimately, cognitive applications hold the promise of receiving a user query and immediately providing a data-driven answer from a masked data supply chain in response. As they evolve, it is likewise anticipated that cognitive applications may enable a new class of "sixth sense" applications that intelligently detect and learn from relevant data and events to offer insights, predictions and advice rather than wait for commands. Just as web and mobile applications changed the way people access data, cognitive applications may change the way people listen to, and become empowered by, multi-structured data such as emails, social media feeds, doctors notes, transaction records, and call logs.

However, the evolution of such cognitive applications has associated challenges, such as how to detect events, ideas, images, and other content that may be of interest. For example, assuming that the role and preferences of a given user are known, how is the most relevant information discovered, prioritized, and summarized from large streams of multi-structured data such as news feeds, blogs, social media, structured data, and various knowledge bases? To further the example, what can a healthcare executive be told about their competitor's market share? Other challenges include the creation of a contextually-appropriate visual summary of responses to questions or queries.

Figure 2:
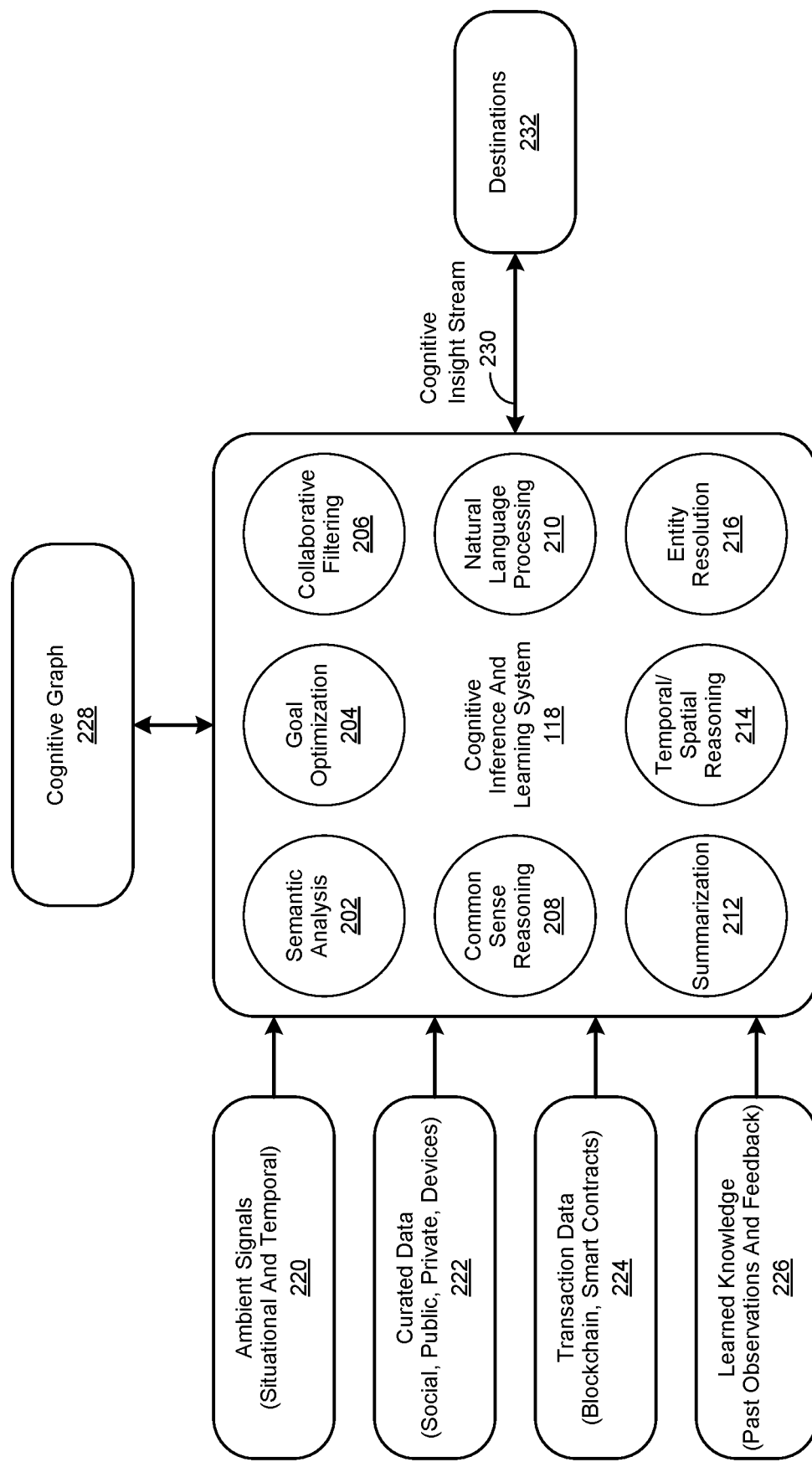
FIG. 2 is a simplified block diagram of a cognitive inference and learning system (CILS)

FIG. 2 is a simplified block diagram of a cognitive inference and learning system (CILS) implemented in accordance with an embodiment of the invention. In various embodiments, the CILS 118 is implemented to incorporate a variety of processes, including semantic analysis 202, goal optimization 204, collaborative filtering 206, common sense reasoning 208, natural language processing 210, summarization 212, temporal/spatial reasoning 214, and entity resolution 216 to generate cognitive insights.

As used herein, semantic analysis 202 broadly refers to performing various analysis operations to achieve a semantic level of understanding about language by relating syntactic structures. In certain embodiments, various syntactic structures are related from the levels of phrases, clauses, sentences, and paragraphs to the level of the body of content as a whole, and to its language-independent meaning. In certain embodiments, the semantic analysis 202 process includes processing a target sentence to parse it into its individual parts of speech, tag sentence elements that are related to certain items of interest, identify dependencies between individual words, and perform co-reference resolution. For example, if a sentence states that the author really enjoys the hamburgers served by a particular restaurant, then the name of the "particular restaurant" is co-referenced to "hamburgers."

As likewise used herein, goal optimization 204 broadly refers to performing multi-criteria decision making operations to achieve a given goal or target objective. In various embodiments, one or more goal optimization 204 processes are implemented by the CILS 118 to define predetermined goals, which in turn contribute to the generation of a cognitive insight. For example, goals for planning a vacation trip may include low cost (e.g., transportation and accommodations), location (e.g., by the beach), and speed (e.g., short travel time). In this example, it will be appreciated that certain goals may be in conflict with another. As a result, a cognitive insight provided by the CILS 118 to a traveler may indicate that hotel accommodations by a beach may cost more than they care to spend.

Collaborative filtering 206, as used herein, broadly refers to the process of filtering for information or patterns through the collaborative involvement of multiple agents, viewpoints, data sources, and so forth. The application of such collaborative filtering 206 processes typically involves very large and different kinds of data sets, including sensing and monitoring data, financial data, and user data of various kinds. Collaborative filtering 206 may also refer to the process of making automatic predictions associated with predetermined interests of a user by collecting preferences or other information from many users. For example, if person 'A' has the same opinion as a person 'B' for a given issue 'x', then an assertion can be made that person 'A' is more likely to have the same opinion as person 'B' opinion on a different issue 'y' than to have the same opinion on issue 'y' as a randomly chosen person. In various embodiments, the collaborative filtering 206 process is implemented with various recommendation engines familiar to those of skill in the art to make recommendations.

As used herein, common sense reasoning 208 broadly refers to simulating the human ability to make deductions from common facts they inherently know. Such deductions may be made from inherent knowledge about the physical properties, purpose, intentions and possible behavior of ordinary things, such as people, animals, objects, devices, and so on. In various embodiments, common sense reasoning 208 processes are implemented to assist the CILS 118 in understanding and disambiguating words within a predetermined context. In certain embodiments, the common sense reasoning 208 processes are implemented to allow the CILS 118 to generate text or phrases related to a target word or phrase to perform deeper searches for the same terms. It will be appreciated that if the context of a word is better understood, then a common sense understanding of the word can then be used to assist in finding better or more accurate information. In various embodiments, this better or more accurate understanding of the context of a word, and its related information, allows the CILS 118 to make more accurate deductions, which are in turn used to generate cognitive insights.

As likewise used herein, natural language processing (NLP) 210 broadly refers to interactions with a system, such as the CILS 118, through the use of human, or natural, languages. In certain embodiments, various NLP 210 processes are implemented by the CILS 118 to achieve natural language understanding, which enables it to not only derive meaning from human or natural language input, but to also generate natural language output.

Summarization 212, as used herein, broadly refers to processing a set of information, organizing and ranking it, and then generating a corresponding summary. As an example, a news article may be processed to identify its primary topic and associated observations, which are then extracted, ranked, and presented to the user. As another example, page ranking operations may be performed on the same news article to identify individual sentences, rank them, order them, and determine which of the sentences are most impactful in describing the article and its content. As yet another example, a structured data record, such as a patient's electronic medical record (EMR), may be processed using the summarization 212 process to generate sentences and phrases that describes the content of the EMR. In certain embodiments, various summarization 212 processes are implemented by the CILS 118 to generate summarizations of content streams, which are in turn used to generate cognitive insights.

As used herein, temporal/spatial reasoning 214 broadly refers to reasoning based upon qualitative abstractions of temporal and spatial aspects of common sense knowledge, described in greater detail herein. For example, it is not uncommon for a particular set of data to change over time. Likewise, other attributes, such as its associated metadata, may also change over time. As a result, these changes may affect the context of the data. To further the example, the context of asking someone what they believe they should be doing at 3:00 in the afternoon during the workday while they are at work may be quite different than asking the same user the same question at 3:00 on a Sunday afternoon when they are at home. In certain embodiments, various temporal/spatial reasoning 214 processes are implemented by the CILS 118 to determine the context of queries, and associated data, which are in turn used to generate cognitive insights.

As likewise used herein, entity resolution 216 broadly refers to the process of finding elements in a set of data that refer to the same entity across different data sources (e.g., structured, non-structured, streams, devices, etc.), where the target entity does not share a common identifier. In various embodiments, the entity resolution 216 process is implemented by the CILS 118 to identify significant nouns, adjectives, phrases or sentence elements that represent various predetermined entities within one or more domains. From the foregoing, it will be appreciated that the implementation of one or more of the semantic analysis 202, goal optimization 204, collaborative filtering 206, common sense reasoning 208, natural language processing 210, summarization 212, temporal/spatial reasoning 214, and entity resolution 216 processes by the CILS 118 can facilitate the generation of a semantic, cognitive model.

In certain embodiments, the CILS 118 receives ambient signals 220, curated data 222, transaction data 224, and learned knowledge 226, which is then processed by the CILS 118 to generate one or more cognitive graphs 228. In turn, the one or more cognitive graphs 228 are further used by the CILS 118 to generate cognitive insight streams, which are then delivered to one or more destinations 232, as described in greater detail herein. As used herein, ambient signals 220 broadly refer to input signals, or other data streams, that may contain data providing additional insight or context to the curated data 222, transaction data 224, and learned knowledge 226 received by the CILS 118. For example, ambient signals may allow the CILS 118 to understand that a user is currently using their mobile device, at location 'x', at time 'y', doing activity 'z'. To continue the example, there is a difference between the user using their mobile device while they are on an airplane versus using their mobile device after landing at an airport and walking between one terminal and another.

To extend the example, ambient signals may add additional context, such as the user is in the middle of a three leg trip and has two hours before their next flight. Further, they may be in terminal A1, but their next flight is out of C1, it is lunchtime, and they want to know the best place to eat. Given the available time the user has, their current location, restaurants that are proximate to their predicted route, and other factors such as food preferences, the CILS 118 can perform various cognitive operations and provide a cognitive insight that includes a recommendation for where the user can eat.

To extend the example even further, the user may receive a notification while they are eating lunch at a recommended restaurant that their next flight has been canceled due to the previously-scheduled aircraft being grounded. As a result, the user may receive two cognitive insights suggesting alternative flights on other carriers. The first cognitive insight is related to a flight that leaves within a half hour. The second cognitive insight is related to a second flight that leaves in an hour but requires immediate booking and payment of additional fees. Knowing that they would be unable to make the first flight in time, the user elects to use the second cognitive insight to automatically book the flight and pay the additional fees through the use of a digital currency transaction.

In various embodiments, the curated data 222 may include structured, unstructured, social, public, private, streaming, device, or other types of data described in greater detail herein. In certain embodiments, the transaction data 224 may include blockchain-associated data, smart contract data, or any combination thereof. In various embodiments, the transaction data 224 may likewise include credit or debit card transaction data, financial services data of all kinds (e.g., mortgages, insurance policies, stock transfers, etc.), purchase order data, invoice data, shipping data, receipt data, or any combination thereof. Skilled practitioners of the art will realize that many such examples of transaction data 224 are possible. Accordingly, the foregoing is not intended to limit the spirit, scope or intent of the invention. In certain embodiments, the learned knowledge 226 is based upon past observations and feedback from the presentation of prior cognitive insight streams and recommendations. In various embodiments, the learned knowledge 226 is provided via a feedback look that provides the learned knowledge 226 in the form of a learning stream of data.

As likewise used herein, a cognitive graph 228 refers to a representation of expert knowledge, associated with individuals and groups over a period of time, to depict relationships between people, places, and things using words, ideas, audio and images. As such, it is a machine-readable formalism for knowledge representation that provides a common framework allowing data and knowledge to be shared and reused across user, application, organization, and community boundaries. In various embodiments, the information contained in, and referenced by, a cognitive graph 228 may be derived from many sources (e.g., public, private, social, device), such as curated data 222 and transaction data 224. In certain of these embodiments, the cognitive graph 228 assists in the identification and organization of information associated with how people, places and things are related to one other. In various embodiments, the cognitive graph 228 enables automated agents, described in greater detail herein, to access the Web more intelligently, enumerate inferences through utilization of curated, structured data 222, and provide answers to questions by serving as a computational knowledge engine.

In certain embodiments, the cognitive graph 228 not only elicits and maps expert knowledge by deriving associations from data, it also renders higher level insights and accounts for knowledge creation through collaborative knowledge modeling. In various embodiments, the cognitive graph 228 is a machine-readable, declarative memory system that stores and learns both episodic memory (e.g., specific personal experiences associated with an individual or entity), and semantic memory, which stores factual information (e.g., geo location of an airport or restaurant).

For example, the cognitive graph 228 may know that a given airport is a place, and that there is a list of related places such as hotels, restaurants and departure gates. Furthermore, the cognitive graph 228 may know that people such as business travelers, families and college students use the airport to board flights from various carriers, eat at various restaurants, or shop at certain retail stores. The cognitive graph 228 may also have knowledge about the key attributes from various retail rating sites that travelers have used to describe the food and their experience at various venues in the airport over the past six months.

In certain embodiments, the cognitive insight stream 230 is bidirectional, and supports flows of information both too and from destinations 232. In these embodiments, the first flow is generated in response to receiving a query, and subsequently delivered to one or more destinations 232. The second flow is generated in response to detecting information about a user of one or more of the destinations 232. Such use results in the provision of information to the CILS 118. In response, the CILS 118 processes that information, in the context of what it knows about the user, and provides additional information to the user, such as a recommendation. In various embodiments, the cognitive insight stream 230 is configured to be provided in a "push" stream configuration familiar to those of skill in the art. In certain embodiments, the cognitive insight stream 230 is implemented to use natural language approaches familiar to skilled practitioners of the art to support interactions with a user.

In various embodiments, the cognitive insight stream 230 may include a stream of visualized insights. As used herein, visualized insights broadly refer to cognitive insights that are presented in a visual manner, such as a map, an infographic, images, and so forth. In certain embodiments, these visualized insights may include various cognitive insights, such as "What happened?", "What do I know about it?", "What is likely to happen next?", or "What should I do about it?" In these embodiments, the cognitive insight stream is generated by various cognitive agents, which are applied to various sources, datasets, and cognitive graphs. As used herein, a cognitive agent broadly refers to a computer program that performs a task with minimum specific directions from users and learns from each interaction with data and human users.

In various embodiments, the CILS 118 delivers Cognition as a Service (CaaS). As such, it provides a cloud-based development and execution platform that allow various cognitive applications and services to function more intelligently and intuitively. In certain embodiments, cognitive applications powered by the CILS 118 are able to think and interact with users as intelligent virtual assistants. As a result, users are able to interact with such cognitive applications by asking them questions and giving them commands. In response, these cognitive applications will be able to assist the user in completing tasks and managing their work more efficiently.

In these and other embodiments, the CILS 118 can operate as an analytics platform to process big data, and dark data as well, to provide data analytics through a public, private or hybrid cloud environment. As used herein, cloud analytics broadly refers to a service model wherein data sources, data models, processing applications, computing power, analytic models, and sharing or storage of results are implemented within a cloud environment to perform one or more aspects of analytics.

In various embodiments, users submit queries and computation requests in a natural language format to the CILS 118. In response, they are provided with a ranked list of relevant answers and aggregated information with useful links and pertinent visualizations through a graphical representation. In these embodiments, the cognitive graph 228 generates semantic and temporal maps to reflect the organization of unstructured data and to facilitate meaningful learning from potentially millions of lines of text, much in the same way as arbitrary syllables strung together create meaning through the concept of language.

Figure 3:
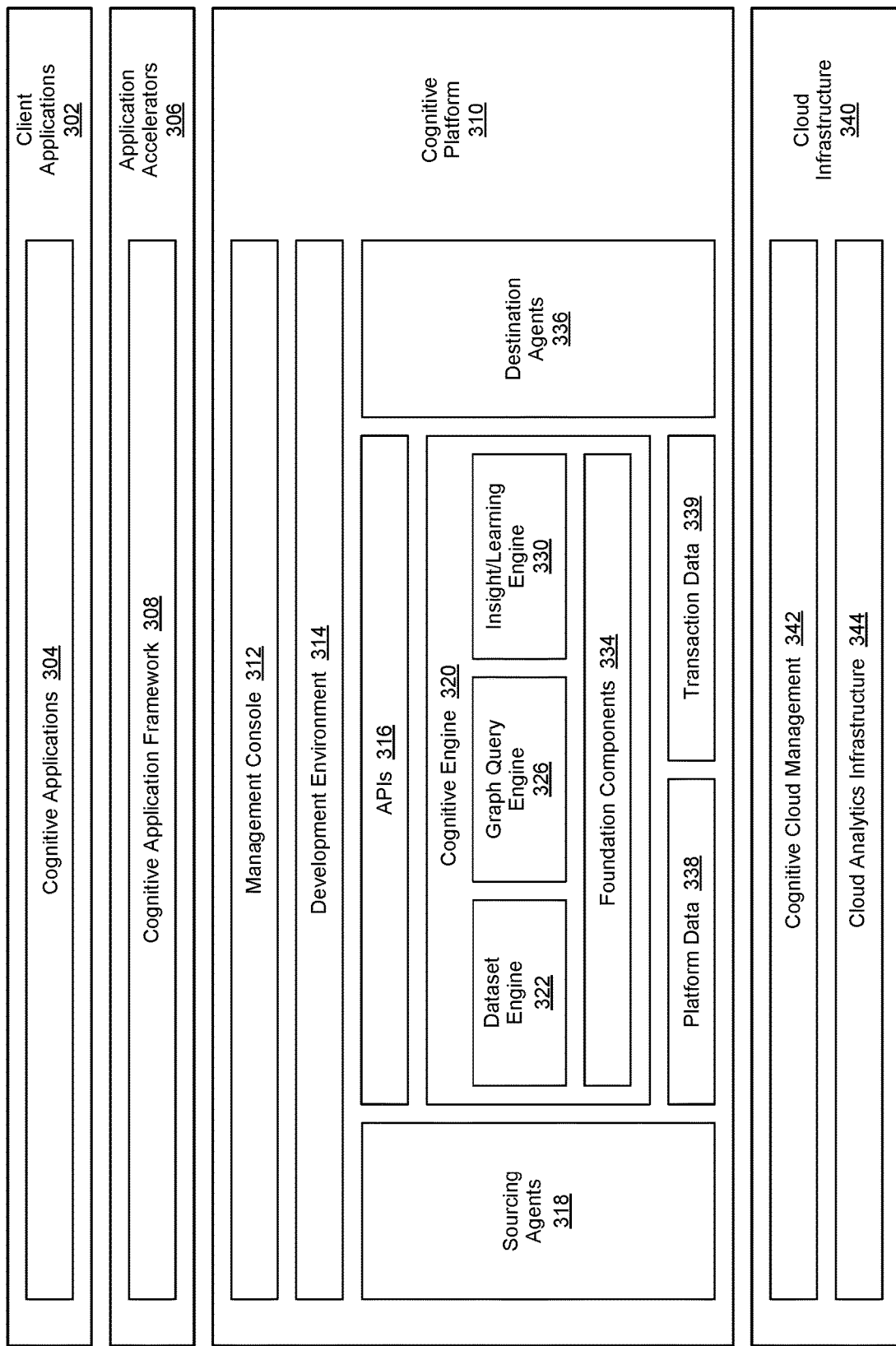
FIG. 3 is a simplified block diagram of a CILS reference model implemented in accordance with an embodiment of the invention.

FIG. 3 is a simplified block diagram of a cognitive inference and learning system (CILS) reference model implemented in accordance with an embodiment of the invention. In this embodiment, the CILS reference model is associated with the CILS 118 shown in FIG. 2. As shown in FIG. 3, the CILS reference model includes client applications 302, application accelerators 306, a cognitive platform 310, and cloud infrastructure 340. In various embodiments, the client applications 302 include cognitive applications 304, which are implemented to understand and adapt to the user, not the other way around, by natively accepting and understanding human forms of communication, such as natural language text, audio, images, video, and so forth.

In these and other embodiments, the cognitive applications 304 possess situational and temporal awareness based upon ambient signals from users and data, which facilitates understanding the user's intent, content, context and meaning to drive goal-driven dialogs and outcomes. Further, they are designed to gain knowledge over time from a wide variety of structured, non-structured, transactional, and device data sources, continuously interpreting and autonomously reprogramming themselves to better understand a given domain. As such, they are well-suited to support human decision making, by proactively providing trusted advice, offers and recommendations while respecting user privacy and permissions.

In various embodiments, the application accelerators 306 include a cognitive application framework 308. In certain embodiments, the application accelerators 306 and the cognitive application framework 308 support various plug-ins and components that facilitate the creation of client applications 302 and cognitive applications 304. In various embodiments, the application accelerators 306 include widgets, user interface (UI) components, reports, charts, and back-end integration components familiar to those of skill in the art.

As likewise shown in FIG. 3, the cognitive platform 310 includes a management console 312, a development environment 314, application program interfaces (APIs) 316, sourcing agents 318, a cognitive engine 320, destination agents 336, platform data 338, and transaction data 339, all of which are described in greater detail herein. In various embodiments, the management console 312 is implemented to manage accounts and projects, along with user-specific metadata that is used to drive processes and operations within the cognitive platform 310 for a predetermined project.

In certain embodiments, the development environment 314 is implemented to create custom extensions to the CILS 118 shown in FIG. 2. In various embodiments, the development environment 314 is implemented for the development of a custom application, which may subsequently be deployed in a public, private or hybrid cloud environment. In certain embodiments, the development environment 314 is implemented for the development of a custom sourcing agent, a custom bridging agent, a custom destination agent, or various analytics applications or extensions.

In various embodiments, the APIs 316 are implemented to build and manage certain cognitive applications 304, described in greater detail herein, which are then executed on the cognitive platform 310 to generate cognitive insights. Likewise, the sourcing agents 318 are implemented in various embodiments to source a variety of multi-site, multi-structured source streams of data described in greater detail herein. In various embodiments, the cognitive engine 320 includes a dataset engine 322, a graph query engine 326, an insight/learning engine 330, and foundation components 334. In certain embodiments, the dataset engine 322 is implemented to establish and maintain a dynamic data ingestion and enrichment pipeline. In these and other embodiments, the dataset engine 322 may be implemented to orchestrate one or more sourcing agents 318 to source data. Once the data is sourced, the data set engine 322 performs data enriching and other data processing operations, described in greater detail herein, and generates one or more sub-graphs that are subsequently incorporated into a target cognitive graph.

In various embodiments, the graph query engine 326 is implemented to receive and process queries such that they can be bridged into a cognitive graph, as described in greater detail herein, through the use of a bridging agent. In certain embodiments, the graph query engine 326 performs various natural language processing (NLP), familiar to skilled practitioners of the art, to process the queries. In various embodiments, the insight/learning engine 330 is implemented to encapsulate a predetermined algorithm, which is then applied to a cognitive graph to generate a result, such as a recommendation or a cognitive insight, described in greater detail herein. In certain embodiments, one or more such algorithms may contribute to answering a specific question and provide additional recommendations or cognitive insights. In various embodiments, two or more of the dataset engine 322, the graph query engine 326, and the insight/learning engine 330 may be implemented to operate collaboratively to generate a recommendation or cognitive insight. In certain embodiments, one or more of the dataset engine 322, the graph query engine 326, and the insight/learning engine 330 may operate autonomously to generate a recommendation or cognitive insight.

The foundation components 334 shown in FIG. 3 include various reusable components, familiar to those of skill in the art, which are used in various embodiments to enable the dataset engine 322, the graph query engine 326, and the insight/learning engine 330 to perform their respective operations and processes. Examples of such foundation components 334 include natural language processing (NLP) components and core algorithms, such as cognitive algorithms.

In various embodiments, the platform data 338 includes various data repositories, described in greater detail herein, that are accessed by the cognitive platform 310 to generate cognitive insights. In certain embodiments, the transaction data 339 includes blockchain data associated with one or more public blockchains, one or more private blockchains, or a combination thereof. In various embodiments, the transaction data 339 is used to generate a blockchain-associated cognitive insight. In certain embodiments, the platform data 338 and the blockchain data 339 are used in combination to generate a blockchain-associated cognitive insight.

In various embodiments, the destination agents 336 are implemented to publish cognitive insights to a consumer of cognitive insight data. Examples of such consumers of cognitive insight data include target databases, public or private blockchains, business intelligence applications, and mobile applications. It will be appreciated that many such examples of cognitive insight data consumers are possible. Accordingly, the foregoing is not intended to limit the spirit, scope or intent of the invention. In certain embodiments, as described in greater detail herein, the cloud infrastructure 340 includes cognitive cloud management 342 components and analytics infrastructure 344 components.

Figure 4:
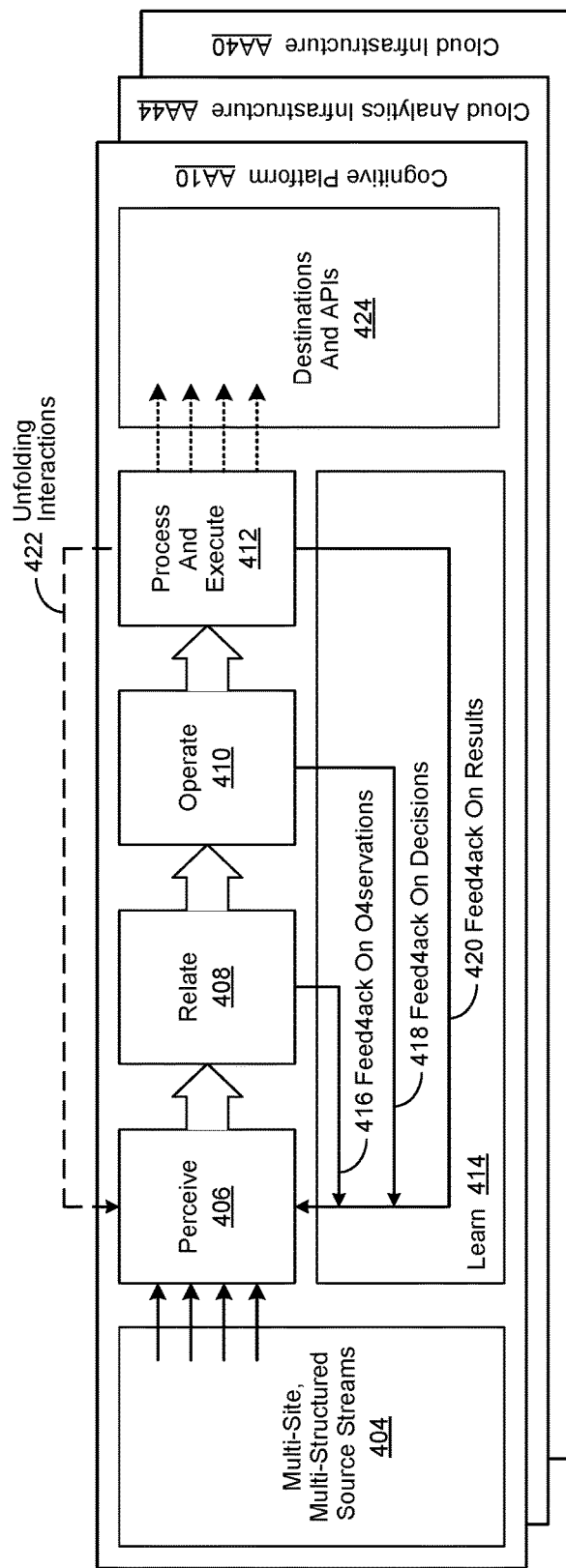
FIG. 4 is a simplified process diagram of CILS operations.

FIG. 4 is a simplified process diagram of cognitive inference and learning system (CILS) operations performed in accordance with an embodiment of the invention. In various embodiments, these CILS operations may include a perceive 406 phase, a relate 408 phase, an operate 410 phase, a process and execute 412 phase, and a learn 414 phase. In these and other embodiments, the CILS 118 shown in FIG. 2 is implemented to s cognitive processes associated with the human brain. In certain embodiments, the CILS operations are performed through the implementation of a cognitive platform. In these and other embodiments, the cognitive platform may be implemented within a cloud analytics infrastructure, which in turn is implemented within a cloud infrastructure.

In various embodiments, multi-site, multi-structured source streams 404 are provided by sourcing agents, described in greater detail herein. In these embodiments, the source streams 404 are dynamically ingested in real-time during the perceive 406 phase, and based upon a particular context, extraction, parsing, and tagging operations are performed on language, text and images they contain. Automatic feature extraction and modeling operations are then performed with the previously processed source streams 404 during the relate 408 phase to generate queries to identify related data (e.g., corpus expansion).

In certain embodiments, operations are performed during the operate 410 phase to discover, summarize and prioritize various concepts, which are in turn used to generate actionable recommendations and notifications associated with certain plan-based optimization goals. The resulting actionable recommendations and notifications are then processed during the process and execute 412 phase to provide cognitive insights, such as recommendations, to various predetermined destinations and associated application programming interfaces (APIs) 424.

In various embodiments, features from newly-observed data are automatically extracted from user feedback during the learn 414 phase to improve various analytical models. In these embodiments, the learn 414 phase includes feedback on observations generated during the relate 408 phase, which is provided to the perceive 406 phase. Likewise, feedback on decisions resulting from operations performed during the operate 410 phase, and feedback on results resulting from operations performed during the process and execute 412 phase, are also provided to the perceive 406 phase.

In certain embodiments, user interactions result from operations performed during the process and execute 412 phase. In these embodiments, data associated with the user interactions are provided to the perceive 406 phase as unfolding interactions 422, which include events that occur external to the CILS operations described in greater detail herein. As an example, a first query from a user may be submitted to the CILS system, which in turn generates a first cognitive insight, which is then provided to the user. In response, the user may respond by providing a first response, or perhaps a second query, either of which is provided in the same context as the first query. The CILS receives the first response or second query, performs various CILS operations, and provides the user a second cognitive insight. As before, the user may respond with a second response or a third query, again in the context of the first query. Once again, the CILS performs various CILS operations and provides the user a third cognitive insight, and so forth. In this example, the provision of cognitive insights to the user, and their various associated responses, results in unfolding interactions 422, which in turn result in a stateful dialog that evolves over time. Skilled practitioners of the art will likewise realize that such unfolding interactions 422, occur outside of the CILS operations performed by the cognitive platform 310.

Figure 5:
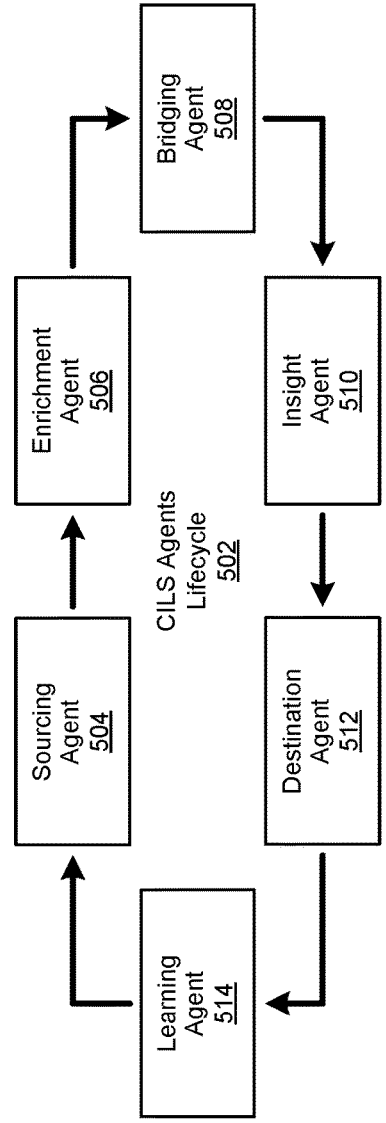
FIG. 5 depicts the lifecycle of CILS agents implemented to perform CILS operations.

FIG. 5 depicts the lifecycle of cognitive inference and learning system (CILS) agents implemented in accordance with an embodiment of the invention to perform CILS operations. In various embodiments, the CILS agents lifecycle 502 may include implementation of a sourcing 504 agent, an enrichment 506 agent, a bridging 508 agent, an insight 510 agent, a destination 512 agent, and a learning 514 agent. In these embodiments, the sourcing 504 agent is implemented to source a variety of multi-site, multi-structured source streams of data described in greater detail herein. In certain embodiments, the sourcing 504 agent may include a batch upload agent, an Application Program Interface (API) connectors agent, a real-time streams agent, a Structured Query Language (SQL)/Not Only SQL (NoSQL) databases agent, a message engines agent, a transaction sourcing agent, one or more custom sourcing agents, or some combination thereof. Skilled practitioners of the art will realize that other types of sourcing agents 504 may be used in various embodiments.

These sourced data streams are then provided to an enrichment 506 agent, which then invokes an enrichment component to perform enrichment operations familiar to those of skill in the art to generate enriched data streams. As an example, a data stream may be sourced from Associated Press® by a sourcing agent 504 and provided to an enrichment component. In turn, the enrichment component may enrich the data stream by performing sentiment analysis, geotagging, and entity detection operations. In certain embodiments, the enrichment operations include filtering operations familiar to skilled practitioners of the art. To further the preceding example, the Associated Press® data stream may be filtered by a predetermined geography attribute to generate an enriched data stream.

The enriched data streams are then provided to a bridging 508 agent, which is used to perform bridging operations. In various embodiments, the bridging operations are performed to provide domain-specific responses when bridging a translated query to a target cognitive graph. For example, the same query bridged to various cognitive graphs may result in different answers for different domains. In certain embodiments, the bridging operations are implemented to process what is known about the translated query, in the context of the user, to provide an answer that is relevant to a specific domain.

As an example, a user may ask, "Where should I eat today?" If the user has been prescribed a particular health regimen, the bridging operations may result in a suggestion for a restaurant with a "heart healthy" menu. However, if the user is a business traveler, the bridging operations may result in a suggestion for the nearest restaurant that has the user's favorite food. In various embodiments, performance of the bridging operations may result in the provision of answers or suggestions that are composed and ranked according to a specific domain of use.

The results of the bridging operations are in turn provided to an insight 510 agent, which is implemented in certain embodiments to create a visual data story highlighting user-specific insights, relationships and recommendations. In various embodiments, insight agents 510 use a particular cognitive graph, described in greater detail herein, as a data source to generate individual cognitive insights. In certain embodiments, the cognitive graph may be implemented as an application cognitive graph, likewise described in greater detail herein.

The resulting visual data story is then provided to a destination 512 agent, which is implemented in various embodiments to publish cognitive insights to a consumer of cognitive insight data. Examples of such consumers of cognitive insight data include target databases, public or private blockchains, business intelligence applications, and mobile applications. In various embodiments, destination agents 512 may include a Hypertext Transfer Protocol (HTTP) stream agent, an API connectors agent, a databases agent, a message engines agent, a mobile push notification agent, a transaction destination agent, custom destination agents, or some combination thereof.

In response to receipt of the visual data story, the consumer of cognitive insight data provides feedback to a learning 514 agent, which is implemented in certain embodiments to provide the feedback to the sourcing agent 504, at which point the CILS agents lifecycle 502 is continued. In various embodiments, a learning agent 514 is implemented to work in the background to continually update a cognitive graph, as described in greater detail herein, from each unique interaction with data and users. From the foregoing, skilled practitioners of the art will recognize that each iteration of the cognitive agents lifecycle 502 provides more informed cognitive insights.

Figure 6A:
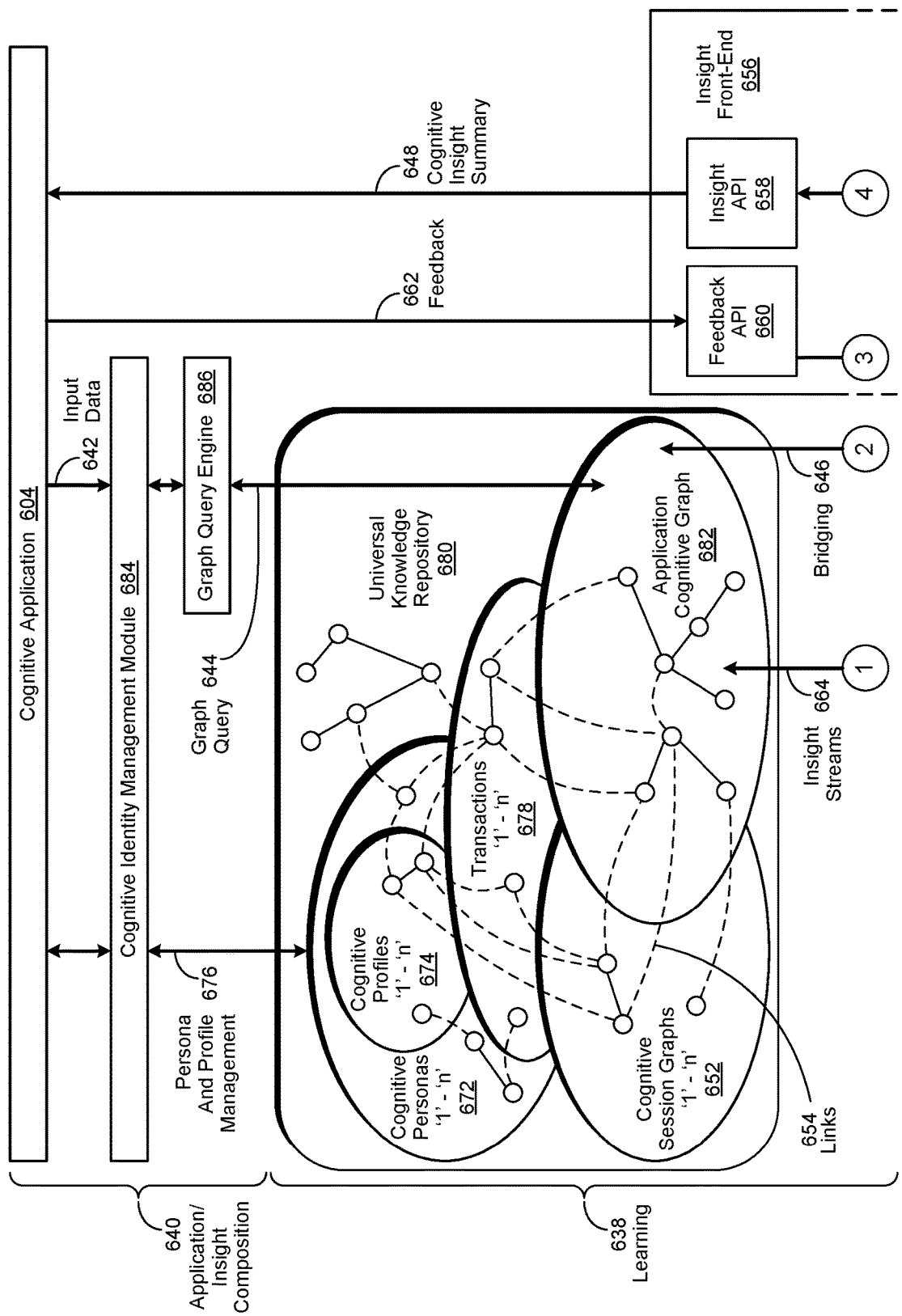
FIGS. 6*a* and 6*b* are a simplified process flow diagram showing the generation of cognitive insights by a CILS.
Figure 6B:
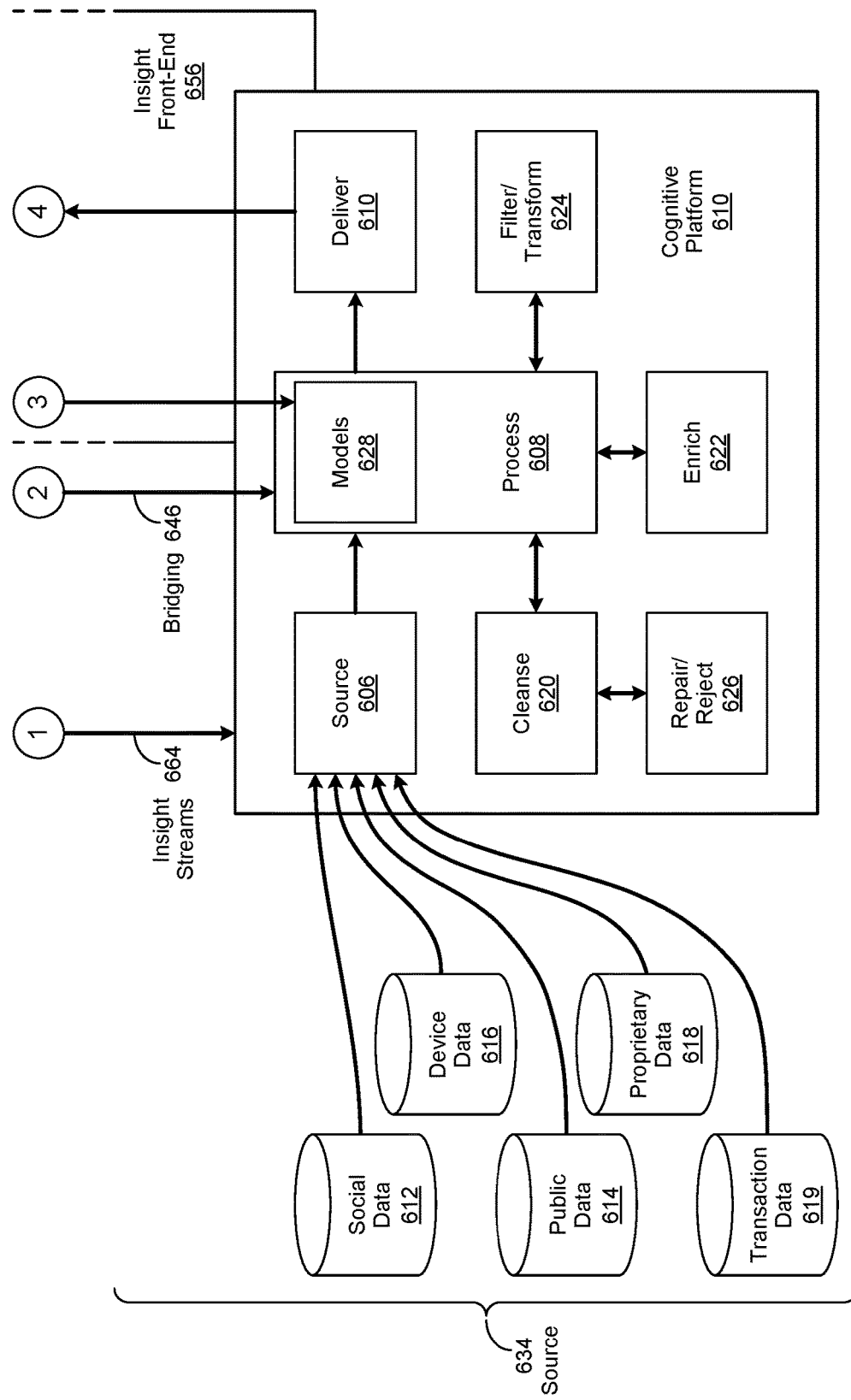

FIGS. 6a and 6b are a simplified process flow diagram showing the generation of cognitive insights by a Cognitive Inference and Learning System (CILS) implemented in accordance with an embodiment of the invention. In various embodiments, insight agents use a cognitive graph, such as an application cognitive graph 682, to generate individual cognitive insights. As used herein, an application cognitive graph 682 broadly refers to a cognitive graph that is associated with a particular cognitive application 604. In various embodiments, different cognitive applications 604 may interact with different application cognitive graphs 682 to generate individual cognitive insights for a user. In certain embodiments, the resulting individual cognitive insights are then composed to generate a set of cognitive insights, which in turn is provided to a user in the form of a cognitive insight summary 648.

In various embodiments, the orchestration of the selected insight agents is performed by the cognitive insight/learning engine 330 shown in FIG. 3. In certain embodiments, a subset of insight agents is selected to provide cognitive insights to satisfy a graph query 644, a contextual situation, or some combination thereof. For example, it may be determined, as likewise described in greater detail herein, that a particular subset of insight agents may be suited to provide a cognitive insight related to a particular user of a particular device, at a particular location, at a particular time, for a particular purpose.

In various embodiments, the insight agents are selected for orchestration as a result of receiving direct or indirect input data 642 from a user. In certain embodiments, the direct user input data 642 may be a natural language inquiry. In various embodiments, the indirect user input data 642 may include the location of a user's device or the purpose for which it is being used. As an example, the Geographical Positioning System (GPS) coordinates of the location of a user's mobile device may be received as indirect user input data 642. As another example, a user may be using the integrated camera of their mobile device to take a photograph of a location, such as a restaurant, or an item, such as a food product.

In certain embodiments, the direct or indirect user input data 642 may include personal information that can be used to identify the user. In various embodiments, a cognitive identity management module 684 is implemented to manage personal information associated with the user. In certain embodiments, the cognitive identity management module 684 is implemented to manage the provision of certain personal information associated with the user for inclusion in a cognitive insight. In various embodiments, the cognitive identity management module 684 is implemented to interact with one or more cognitive applications 604. In certain of these embodiments, the cognitive identity management module 684 is implemented encrypt certain personal information associated with a user prior to its inclusion in a cognitive insight. Skilled practitioners of the art will recognize that many such embodiments are possible. Accordingly, the foregoing is not intended to limit the spirit, scope or intent of the invention.

In various embodiments, cognitive insight generation and associated feedback operations may be performed in various phases. In this embodiment, these phases include a data lifecycle 636 phase, a learning 638 phase, and an application/insight composition 640 phase. In the data lifecycle 636 phase, an instantiation of a cognitive platform 610 sources social data 612, public data 614, licensed data 616, proprietary data 618, and transaction data 619 from various sources as described in greater detail herein. In various embodiments, the instantiation of a cognitive platform 610 includes a source 606 component, a process 608 component, a deliver 610 component, a cleanse 620 component, an enrich 622 component, a filter/transform 624 component, and a repair/reject 626 component. Likewise, as shown in FIG. 6a, the process 608 component includes a repository of models 628, described in greater detail herein.

In various embodiments, the process 608 component is implemented to perform various cognitive insight generation and other processing operations described in greater detail herein. In these embodiments, the process 608 component is implemented to interact with the source 606 component, which in turn is implemented to perform various data sourcing operations described in greater detail herein. In various embodiments, the sourcing operations are performed by one or more sourcing agents, as likewise described in greater detail herein. The resulting sourced data is then provided to the process 608 component. In turn, the process 608 component is implemented to interact with the cleanse 620 component, which is implemented to perform various data cleansing operations familiar to those of skill in the art. As an example, the cleanse 620 component may perform data normalization or pruning operations, likewise known to skilled practitioners of the art. In certain embodiments, the cleanse 620 component may be implemented to interact with the repair/reject 626 component, which in turn is implemented to perform various data repair or data rejection operations known to those of skill in the art.

Once data cleansing, repair and rejection operations are completed, the process 608 component is implemented to interact with the enrich 622 component, which is implemented in various embodiments to perform various data enrichment operations described in greater detail herein. Once data enrichment operations have been completed, the process 608 component is likewise implemented to interact with the filter/transform 624 component, which in turn is implemented to perform data filtering and transformation operations described in greater detail herein.

In various embodiments, the process 608 component is implemented to generate various models, described in greater detail herein, which are stored in the repository of models 628. The process 608 component is likewise implemented in various embodiments to use the sourced data to generate one or more cognitive graphs, such as an application cognitive graph 682 and the repository of transactions '1' through 'n' 678, as likewise described in greater detail herein. In various embodiments, the process 608 component is implemented to gain an understanding of the data sourced from the sources of social data 612, public data 614, device data 616, proprietary data 618, and transaction data 619, which assist in the automated generation of the application cognitive graph 682 and the repository of transactions '1' through 'n' 678.

The process 608 component is likewise implemented in various embodiments to perform bridging 646 operations, described in greater detail herein, to access the application cognitive graph 682 and the repository of transactions '1' through 'n' 678. In certain embodiments, the bridging 646 operations are performed by bridging agents, likewise described in greater detail herein. In various embodiments, the application cognitive graph 682 and the repository of transactions '1' through 'n' 678 are accessed by the process 608 component during the learn 636 phase of the cognitive insight generation operations.

In various embodiments, a cognitive application 604 is implemented to receive input data associated with an individual user or a group of users. In these embodiments, the input data may be direct, such as a user query or mouse click, or indirect, such as the current time or Geographical Positioning System (GPS) data received from a mobile device associated with a user. In various embodiments, the indirect input data may include contextual data, described in greater detail herein. Once it is received, the input data 642 is then submitted by the cognitive application 604 to a graph query engine 686 during the application/insight composition 640 phase. In various embodiments, an inferred learning style, described in greater detail herein, is implemented by the CILS to perform cognitive learning operation. In certain embodiments, the CILS is likewise implemented to interpret the results of the cognitive learning operations such that they are consumable by a recipient, and by extension, present them in a form that this actionable in act 640 phase. In various embodiments, the act 640 phase is implemented to support an interaction, described in greater detail herein.

The submitted input data 642 is then processed by the graph query engine 686 to generate a graph query 644, as described in greater detail herein. The graph query 644 is then used to query the application cognitive graph 682, which results in the generation of one or more cognitive insights, likewise described in greater detail herein. In certain embodiments, the graph query 644 uses knowledge elements stored in the universal knowledge repository 680 and the repository of transactions '1' through 'n' 678 when querying the application cognitive graph 682 to generate the one or more cognitive insights.

In various embodiments, the graph query 644 results in the selection of a cognitive persona from a repository of cognitive personas '1' through 'n' 672, according to a set of contextual information associated with a user. As used herein, a cognitive persona broadly refers to an archetype user model that represents a common set of attributes associated with a hypothesized group of users. In various embodiments, the common set of attributes may be described through the use of demographic, geographic, psychographic, behavioristic, and other information. As an example, the demographic information may include age brackets (e.g., 25 to 34 years old), gender, marital status (e.g., single, married, divorced, etc.), family size, income brackets, occupational classifications, educational achievement, and so forth. Likewise, the geographic information may include the cognitive persona's typical living and working locations (e.g., rural, semi-rural, suburban, urban, etc.) as well as characteristics associated with individual locations (e.g., parochial, cosmopolitan, population density, etc.).

The psychographic information may likewise include information related to social class (e.g., upper, middle, lower, etc.), lifestyle (e.g., active, healthy, sedentary, reclusive, etc.), interests (e.g., music, art, sports, etc.), and activities (e.g., hobbies, travel, going to movies or the theatre, etc.). Other psychographic information may be related to opinions, attitudes (e.g., conservative, liberal, etc.), preferences, motivations (e.g., living sustainably, exploring new locations, etc.), and personality characteristics (e.g., extroverted, introverted, etc.) Likewise, the behavioristic information may include information related to knowledge and attitude towards various manufacturers or organizations and the products or services they may provide.

In various embodiments, one or more cognitive personas may be associated with a user. In certain embodiments, a cognitive persona is selected and then used by a CILS to generate one or more cognitive insights as described in greater detail herein. In these embodiments, the cognitive insights that are generated for a user as a result of using a first cognitive persona may be different than the cognitive insights that are generated as a result of using a second cognitive persona.

In various embodiments, provision of the cognitive insights results in the CILS receiving feedback 662 data from various individual users and other sources, such as a cognitive application 604. In one embodiment, the feedback 662 data is used to revise or modify the cognitive persona. In another embodiment, the feedback 662 data is used to create a new cognitive persona. In yet another embodiment, the feedback 662 data is used to create one or more associated cognitive personas, which inherit a common set of attributes from a source cognitive persona. In one embodiment, the feedback 662 data is used to create a new cognitive persona that combines attributes from two or more source cognitive personas. In another embodiment, the feedback 662 data is used to create a cognitive profile, described in greater detail herein, based upon the cognitive persona. Those of skill in the art will realize that many such embodiments are possible. Accordingly, the foregoing is not intended to limit the spirit, scope or intent of the invention.

In certain embodiments, the universal knowledge repository 680 includes a repository of personas '1' through 'n'

672. In various embodiments, a repository of cognitive profiles '1' through 'n' 674 is included in the repository of personas '1' through 'n' 672. In certain embodiments, the universal knowledge repository 680 may contain a repository of session graphs '1' through 'n' 652. In various embodiments, the universal knowledge repository 680 may contain the repository of transactions '1' through 'n' 678. In certain embodiments, the repository of personas '1' through 'n' 672, the repository of cognitive profiles '1' through 'n' 674, and the repository of transactions '1' through 'n' 678 are implemented as cognitive graphs.

In various embodiments, individual nodes within cognitive personas stored in the repository of personas '1' through 'n' 672 are linked 654 to corresponding nodes in the universal knowledge repository 680. In certain embodiments, individual nodes within cognitive personas stored in the repository of personas '1' through 'n' 672 are linked 654 to corresponding nodes in the repository of cognitive profiles '1' through 'n' 674. In various embodiments, individual nodes within the repository of personas '1' through 'n' 672, and individual nodes within the cognitive profiles '1' through 'n' 674, are linked 654 to corresponding nodes in the repository of transactions '1' through 'n' 678. In certain embodiments, individual nodes within the repository of cognitive profiles '1' through 'n' 674 are linked 654 to corresponding nodes within the universal knowledge repository 680, which are likewise linked 654 to corresponding nodes within the cognitive application graph 682.

As used herein, contextual information broadly refers to information associated with a location, a point in time, a user role, an activity, a circumstance, an interest, a desire, a perception, an objective, or a combination thereof. In various embodiments, the contextual information is likewise used in combination with the selected cognitive persona to generate one or more cognitive insights for a user. In certain embodiments, the contextual information may likewise be used in combination with the selected cognitive persona to perform one or more associated cognitive learning operations. In various embodiments, the cognitive insights that are generated for a user as a result of using a first set of contextual information may be different than the cognitive insights that are generated as a result of using a second set of contextual information.

In one embodiment, the result of using a first set of contextual information in combination with the selected cognitive persona to perform an associated cognitive learning operation may be different than the result of using a second set of contextual information in combination with the selected cognitive persona to perform the same cognitive learning operation. In another embodiment, the cognitive insights that are generated for a user as a result of using a set of contextual information with a first cognitive persona may be different than the cognitive insights that are generated as a result of using the same set of contextual information with a second cognitive persona. In yet another embodiment, the result of using a set of contextual information in combination with a first cognitive persona to perform an associated cognitive learning operation may be different than the result of using the same set of contextual information in combination with a second cognitive persona to perform the same cognitive learning operation.

As an example, a user may have two associated cognitive personas, "purchasing agent" and "retail shopper," which are respectively selected according to two sets of contextual information. In this example, the "purchasing agent" cognitive persona may be selected according to a first set of contextual information associated with the user performing business purchasing activities in their office during business hours, with the objective of finding the best price for a particular commercial inventory item. Conversely, the "retail shopper" cognitive persona may be selected according to a second set of contextual information associated with the user performing personal shopping activities in their home over a weekend, with the objective of finding a decorative item that most closely matches their current furnishings.

Those of skill in the art will realize that the cognitive insights generated as a result of combining the first cognitive persona with the first set of contextual information will likely be different than the cognitive insights generated as a result of combining the second cognitive persona with the second set of contextual information. Likewise, the result of a cognitive learning operation that uses the first cognitive persona in combination with the first set of contextual information will likely be different that the result of a cognitive learning operation that uses a second cognitive persona in combination with a second set of contextual information.

In various embodiments, the graph query 644 results in the selection of a cognitive profile from a repository of cognitive profiles '1' through 'n' 674 according to identification information associated with a user. As used herein, a cognitive profile broadly refers to an instance of a cognitive persona that references personal data associated with a user. In various embodiments, the personal data may include the user's name, address, Social Security Number (SSN), age, gender, marital status, occupation, employer, income, education, skills, knowledge, interests, preferences, likes and dislikes, goals and plans, and so forth. In certain embodiments, the personal data may include data associated with the user's interaction with a CILS and related cognitive insights that are generated and provided to the user.

In various embodiments, the personal data may be distributed. In certain of these embodiments, subsets of the distributed personal data may be logically aggregated to generate one or more cognitive profiles, each of which is associated with the user. In various embodiments, the user's interaction with a CILS may be provided to the CILS as feedback 662 data. Skilled practitioners of the art will recognize that many such embodiments are possible. Accordingly, the foregoing is not intended to limit the spirit, scope or intent of the invention.

In various embodiments, a cognitive persona or cognitive profile is defined by a first set of nodes in a weighted cognitive graph. In these embodiments, the cognitive persona or cognitive profile is further defined by a set of attributes that are respectively associated with a set of corresponding nodes in the weighted cognitive graph. In various embodiments, an attribute weight is used to represent a relevance value between two attributes. For example, a higher numeric value (e.g., '5.0') associated with an attribute weight may indicate a higher degree of relevance between two attributes, while a lower numeric value (e.g., '0.5') may indicate a lower degree of relevance.

In various embodiments, the numeric value associated with attribute weights may change as a result of the performance of cognitive insight and feedback 662 operations described in greater detail herein. In one embodiment, the changed numeric values associated with the attribute weights may be used to modify an existing cognitive persona or cognitive profile. In another embodiment, the changed numeric values associated with the attribute weights may be used to generate a new cognitive persona or cognitive profile. In these embodiments, a cognitive profile is selected and then used by a CILS to generate one or more cognitive insights for the user as described in greater detail herein. In certain of these embodiments, the selected cognitive profile provides a basis for adaptive changes to the CILS, and by extension, the cognitive insights it generates. In various embodiments, a cognitive profile may likewise by selected and then used by a CILS to perform one or more cognitive learning operations as described in greater detail herein. In certain of these embodiments, the results of the one or more cognitive learning operations may likewise provide a basis for adaptive changes to the CILS, and by extension, the cognitive insights it generates.

In various embodiments, provision of the cognitive insights results in the CILS receiving feedback 662 information related to an individual user. In one embodiment, the feedback 662 information is used to revise or modify a cognitive persona. In another embodiment, the feedback 662 information is used to revise or modify a cognitive profile associated with a user. In yet another embodiment, the feedback 662 information is used to create a new cognitive profile, which in turn is stored in the repository of cognitive profiles '1' through 'n' 674. In still yet another embodiment, the feedback 662 information is used to create one or more associated cognitive profiles, which inherit a common set of attributes from a source cognitive profile. In another embodiment, the feedback 662 information is used to create a new cognitive profile that combines attributes from two or more source cognitive profiles. In various embodiments, these persona and profile management operations 676 are performed through interactions between the cognitive application 604, the cognitive identity management module 684, the repository of cognitive personas '1' through 'n' 672, the repository of cognitive profiles '1' through 'n' 674, the repository of transactions '1' through 'n' 678, repository of cognitive session graphs '1' through 'n' 652, the universal knowledge repository 680, or some combination thereof.

In various embodiments, the feedback 662 is generated as a result of a user interaction, described in greater detail herein. In various embodiments, the user interaction may be between a user and any combination of devices, applications, services, processes, or other users. In certain embodiments, the user interaction may be explicitly or implicitly initiated by the provision of input data 642 from a user to the devices, applications, services, processes or other users. In various embodiments, the input data 642 may be provided in response to a cognitive insight provided by a CILS. In one embodiment, the input data 642 may include a user gesture, such as a key stroke, mouse click, finger swipe, or eye movement. In another embodiment, the input data may include a voice command from a user.

In yet another embodiment, the input data 642 may include data associated with a user, such as biometric data (e.g., retina scan, fingerprint, body temperature, pulse rate, etc.). In yet still another embodiment, the input data may include environmental data (e.g., current temperature, etc.), location data (e.g., geographical positioning system coordinates, etc.), device data (e.g., telemetry data, etc.), or other data provided by a device, application, service, process or user. In these embodiments, the feedback 662 may be used to perform various cognitive learning operations, the results of which are used to update a cognitive persona or profile associated with a user. Those of skill in the art will realize that many such embodiments are possible. Accordingly, the foregoing is not intended to limit the spirit, scope or intent of the invention.

In various embodiments, a cognitive profile associated with a user may be either static or dynamic. As used herein, a static cognitive profile broadly refers to a cognitive profile that contains identification information associated with a user that changes on an infrequent basis. As an example, a user's name, Social Security Number (SSN), or passport number may not change, although their age, address or employer may change over time. To continue the example, the user may likewise have a variety of financial account identifiers and various travel awards program identifiers which change infrequently.

As likewise used herein, a dynamic cognitive profile refers to a cognitive profile that contains information associated with a user that changes on a dynamic basis. For example, a user's interests and activities may evolve over time, which may be evidenced by associated interactions with the CILS. In various embodiments, these interactions result in the provision of various cognitive insights to the user. In certain embodiments, these interactions may likewise be used to perform one or more associated cognitive learning operations, the results of which may in turn be used to generate a particular cognitive insight. In these embodiments, the user's interactions with the CILS, and the resulting cognitive insights that are generated, are used to update the dynamic cognitive profile on an ongoing basis to provide an up-to-date representation of the user in the context of the cognitive profile used to generate the cognitive insights.

In various embodiments, a cognitive profile, whether static or dynamic, is selected from the repository of cognitive profiles '1' through 'n' 674 according to a set of contextual information associated with a user. In certain embodiments, the contextual information is likewise used in combination with the selected cognitive profile to generate one or more cognitive insights for the user. In various embodiments, the contextual information may likewise be used in combination with the selected cognitive profile to perform one or more associated cognitive learning operations. In one embodiment, the cognitive insights that are generated as a result of using a first set of contextual information in combination with the selected cognitive profile may be different than the cognitive insights that are generated as a result of using a second set of contextual information with the same cognitive profile. In another embodiment, the result of using a first set of contextual information in combination with the selected cognitive profile to perform an associated cognitive learning operation may be different than the result of using a second set of contextual information in combination with the selected cognitive profile to perform the same cognitive learning operation.

In various embodiments, one or more cognitive profiles may be associated with a user. In certain embodiments, the cognitive insights that are generated for a user as a result of using a set of contextual information with a first cognitive profile may be different than the cognitive insights that are generated as a result of using the same set of contextual information with a second cognitive profile. In one embodiment, the result of using a set of contextual information in combination with a first cognitive profile to perform an associated cognitive learning operation may be different than the result of using the same set of contextual information in combination with a second cognitive profile to perform the same cognitive learning operation.

As an example, a user may have two associated cognitive profiles, "runner" and "foodie," which are respectively selected according to two sets of contextual information. In this example, the "runner" cognitive profile may be selected according to a first set of contextual information associated with the user being out of town on business travel and wanting to find a convenient place to run close to where they are staying. To continue this example, the contextual information may be booking and payment information contained within a transaction associated with the user. To further continue this example, two cognitive insights may be generated and provided to the user in the form of a cognitive insight summary 648. The first may be suggesting a running trail the user has used before and liked, but needs directions to find again. The second may be suggesting a new running trail that is equally convenient, but wasn't available the last time the user was in town.

Conversely, the "foodie" cognitive profile may be selected according to a second set of contextual information associated with the user being at home and expressing an interest in trying either a new restaurant or an innovative cuisine. In furtherance of this example, the user's "foodie" cognitive profile may be processed by the CILS to determine which restaurants and cuisines the user has tried in the last eighteen months. In this example, the contextual information may be ordering and payment information contained in various transactions associated with the user. As a result, two cognitive insights may be generated and provided to the user in the form of a cognitive insight summary 648. The first may be a suggestion for a new restaurant that is serving a cuisine the user has enjoyed in the past, as well as a corresponding promotional offer in the form of a smart contract for ordering online or physical presentment through the use of a mobile device. The second may be a suggestion for a restaurant familiar to the user that includes a promotional offer, likewise in the form of a smart contract, for a seasonal menu featuring Asian fusion dishes the user has not tried before.

Those of skill in the art will realize that the cognitive insights generated as a result of combining the first cognitive profile with the first set of contextual information will likely be different than the cognitive insights generated as a result of combining the second cognitive profile with the second set of contextual information. Likewise, the result of a cognitive learning operation that uses the first cognitive profile in combination with the first set of contextual information will likely be different that the result of a cognitive learning operation that uses a second cognitive profile in combination with a second set of contextual information.

In various embodiments, a user's cognitive profile, whether static or dynamic, may reference data that is proprietary to the user, a group, an organization, or some combination thereof. As used herein, proprietary data broadly refers to data that is owned, controlled, or a combination thereof, by an individual user, group, or organization, which is deemed important enough that it gives competitive advantage to that individual or organization. In certain embodiments, the organization may be a governmental, non-profit, academic or social entity, a manufacturer, a wholesaler, a retailer, a service provider, an operator of a cognitive inference and learning system (CILS), and others.

In various embodiments, an organization may or may not grant a user the right to obtain a copy of certain proprietary information referenced by their cognitive profile. In certain embodiments, access to the proprietary information may be controlled through the implementation of a cognitive identity management module 684. In various embodiments, a first organization may or may not grant a user the right to obtain a copy of certain proprietary information referenced by their cognitive profile and provide it to a second organization. As an example, the user may not be granted the right to provide travel detail information (e.g., travel dates and destinations, etc.) associated with an awards program provided by a first travel services provider (e.g., an airline, a hotel chain, a cruise ship line, etc.) to a second travel services provider. In various embodiments, the user may or may not grant a first organization the right to provide a copy of certain proprietary information referenced by their cognitive profile to a second organization. Those of skill in the art will recognize that many such embodiments are possible. Accordingly, the foregoing is not intended to limit the spirit, scope or intent of the invention.

In various embodiments, a set of contextually-related interactions between a cognitive application 604 and the application cognitive graph 682 are represented as a corresponding set of nodes in a cognitive session graph, which is then stored in a repository of cognitive session graphs '1' through 'n' 652. As used herein, a cognitive session graph broadly refers to a cognitive graph whose nodes are associated with a cognitive session. As used herein, a cognitive session broadly refers to a user, group of users, theme, topic, issue, question, intent, goal, objective, task, assignment, process, situation, requirement, condition, responsibility, location, period of time, or any combination thereof. In various embodiments, the results of a cognitive learning operation, described in greater detail herein, may be stored in a session graph.

As an example, the application cognitive graph 682 may be unaware of a particular user's preferences, which are likely stored in a corresponding user profile. To further the example, a user may typically choose a particular brand or manufacturer when shopping for a given type of product, such as cookware, thereby indicating their preferences. A record of each query regarding that brand of cookware, or its selection, is iteratively stored in a session graph that is associated with the user and stored in a repository of session graphs '1' through 'n' 652. Continuing the example further, a cognitive insight, which includes a promotional offer relevant to the preferred brand of cookware, is generated and provided to the user. As a result, the preference of that brand of cookware is ranked higher, and a cognitive insight containing a promotional offer for that brand of cookware is presented in response to the contextually-related queries, even when the preferred brand of cookware is not explicitly referenced by the user. To continue the example, the user may make a number of queries over a period of days or weeks. However, the queries, and their corresponding cognitive insights, are associated with the same cognitive session graph that is associated with the user. Furthermore, the queries and their corresponding cognitive insights are respectively stored in repository of session graphs '1' through 'n' 652 and the repository of cognitive blockchain knowledge 'a' through 'n' 678, regardless of when each query is made. In this example, the record of each query, and their corresponding cognitive insight, is used to perform an associated cognitive learning operation, the results of which may be stored in an associated session graph.

As another example, a user may submit a query to a cognitive application 604 during business hours to find an upscale restaurant located close their place of business. As a result, a first cognitive session graph stored in a repository of cognitive session graphs '1' through 'n' 652 is associated with the user's query, which results in the provision of cognitive insights related to restaurants suitable for business meetings. To continue the example, the same user queries the same cognitive application 604 during the weekend to locate a casual restaurant located close to their home. As a result, a second cognitive session graph stored in a repository of cognitive session graphs '1' through 'n' 652 is associated with the user's query, which results in the provision of cognitive insights related to restaurants suitable for family meals. In these examples, the first and second cognitive session graphs are both associated with the same user, but for two different purposes, which results in the provision of two different sets of cognitive insights.

As yet another example, a group of customer support representatives is tasked with resolving technical issues customers may have with a product. In this example, the product and the group of customer support representatives are collectively associated with a cognitive session graph stored in a repository of cognitive session graphs '1' through 'n' 652. To continue the example, individual customer support representatives may submit queries related to the product to a cognitive application 604, such as a knowledge base application. In response, a cognitive session graph stored in a repository of cognitive session graphs '1' through 'n' 652 is used, along with transaction repositories '1' through 'n' 678, the universal knowledge repository 680, and application cognitive graph 682, to generate individual or composite cognitive insights to resolve a technical issue for a customer. In this example, the cognitive application 604 may be queried by the individual customer support representatives at different times during some time interval, yet the same cognitive session graph stored in a repository of cognitive session graphs '1' through 'n' 652 is used to generate cognitive insights related to the product.

In various embodiments, each cognitive session graph associated with a user, and stored in a repository of cognitive session graphs '1' through 'n' 652, includes one or more direct or indirect user queries represented as nodes, and the time at which they were asked, which are in turn linked 654 to nodes that appear in the application cognitive graph 682. In certain embodiments, each individual cognitive session graph that is associated with the user and stored in a repository of cognitive session graphs '1' through 'n' 652 introduces edges that are not already present in the application cognitive graph 682. More specifically, each of the cognitive session graphs that is associated with the user and stored in a repository of cognitive session graphs '1' through 'n' 652 establishes various relationships that the application cognitive graph 682 does not already have.

In various embodiments, individual cognitive profiles in the repository of cognitive profiles '1' through 'n' 674 are respectively stored as session graphs in the repository of session graphs 652. In these embodiments, nodes within each of the individual cognitive profiles are linked 654 to nodes within corresponding cognitive session graphs stored in the repository of cognitive session graphs '1' through 'n' 654. In certain embodiments, individual nodes within each of the cognitive profiles are likewise linked 654 to corresponding nodes within various cognitive personas stored in the repository of cognitive personas '1' through 'n' 672.

In various embodiments, individual graph queries 644 associated with a session graph stored in a repository of cognitive session graphs '1' through 'n' 652 are likewise provided to insight agents to perform various kinds of analyses. In certain embodiments, each insight agent performs a different kind of analysis. In various embodiments, different insight agents may perform the same, or similar, analyses. In certain embodiments, different agents performing the same or similar analyses may be competing between themselves.

For example, a user may be a realtor that has a young, upper middle-class, urban-oriented clientele that typically enjoys eating at trendy restaurants that are in walking distance of where they live. As a result, the realtor may be interested in knowing about new or popular restaurants that are in walking distance of their property listings that have a young, middle-class clientele. In this example, the user's queries may result the assignment of insight agents to perform analysis of various social media interactions to identify such restaurants that have received favorable reviews. To continue the example, the resulting cognitive insights may be provided as a ranked list of candidate restaurants that may be suitable venues for the realtor to meet his clients.

In various embodiments, the process 608 component is implemented to provide these cognitive insights to the deliver 610 component, which in turn is implemented to deliver the cognitive insights in the form of a cognitive insight summary 648 to the cognitive business processes and applications 604. In these embodiments, the cognitive platform 610 is implemented to interact with an insight front-end 656 component, which provides a composite insight and feedback interface with the cognitive application 604. In certain embodiments, the insight front-end 656 component includes an insight Application Program Interface (API) 658 and a feedback API 660, described in greater detail herein. In these embodiments, the insight API 658 is implemented to convey the cognitive insight summary 648 to the cognitive application 604. Likewise, the feedback API 660 is used to convey associated direct or indirect user feedback 662 to the cognitive platform 610. In certain embodiments, the feedback API 660 provides the direct or indirect user feedback 662 to the repository of models 628 described in greater detail herein.

To continue the preceding example, the user may have received a list of candidate restaurants that may be suitable venues for meeting his clients. However, one of his clients has a pet that they like to take with them wherever they go. As a result, the user provides feedback 662 that he is looking for a restaurant that is pet-friendly. The provided feedback 662 is in turn provided to the insight agents to identify candidate restaurants that are also pet-friendly. In this example, the feedback 662 is stored in the appropriate cognitive session graph 652 associated with the user and their original query.

In various embodiments, as described in greater detail herein, cognitive learning operations are iteratively performed during the learn 636 phase to provide more accurate and useful cognitive insights. In certain of these embodiments, feedback 662 received from the user is stored in a session graph that is associated with the user and stored in a repository of session graphs '1' through 'n' 652, which is then used to provide more accurate cognitive insights in response to subsequent contextually-relevant queries from the user. In various embodiments, the feedback 662 received from the user is used to perform cognitive learning operations, the results of which are then stored in a session graph that is associated with the user. In these embodiments, the session graph associated with the user is stored in a repository of session graphs '1' through 'n' 652.

As an example, cognitive insights provided by a particular insight agent related to a first subject may not be relevant or particularly useful to a user of a cognitive application 604. As a result, the user provides feedback 662 to that effect, which in turn is stored in the appropriate session graph that is associated with the user and stored in a repository of session graphs '1' through 'n' 652. Accordingly, subsequent cognitive insights provided by the insight agent related the first subject may be ranked lower, or not provided, within a cognitive insight summary 648 provided to the user. Conversely, the same insight agent may provide excellent cognitive insights related to a second subject, resulting in positive feedback 662 being received from the user. The positive feedback 662 is likewise stored in the appropriate session graph that is associated with the user and stored in a repository of session graphs '1' through 'n' 652. As a result, subsequent cognitive insights provided by the insight agent related to the second subject may be ranked higher within a cognitive insight summary 648 provided to the user.

In various embodiments, the cognitive insights provided in each cognitive insight summary 648 to the cognitive application 604, and corresponding feedback 662 received from a user in return, are provided to an associated session graph 652 in the form of one or more insight streams 664. In these and other embodiments, the insight streams 664 may contain information related to the user of the cognitive application 604, the time and date of the provided cognitive insights and related feedback 662, the location of the user, and the device used by the user.

As an example, a query related to upcoming activities that is received at 10:00 AM on a Saturday morning from a user's home may return cognitive insights related to entertainment performances scheduled for the weekend. Conversely, the same query received at the same time on a Monday morning from a user's office may return cognitive insights related to business functions scheduled during the work week. In various embodiments, the information contained in the insight streams 664 is used to rank the cognitive insights provided in the cognitive insight summary 648. In certain embodiments, the cognitive insights are continually reranked as additional insight streams 664 are received. Skilled practitioners of the art will recognize that many such embodiments are possible. Accordingly, the foregoing is not intended to limit the spirit, scope or intent of the invention.

Figure 7:
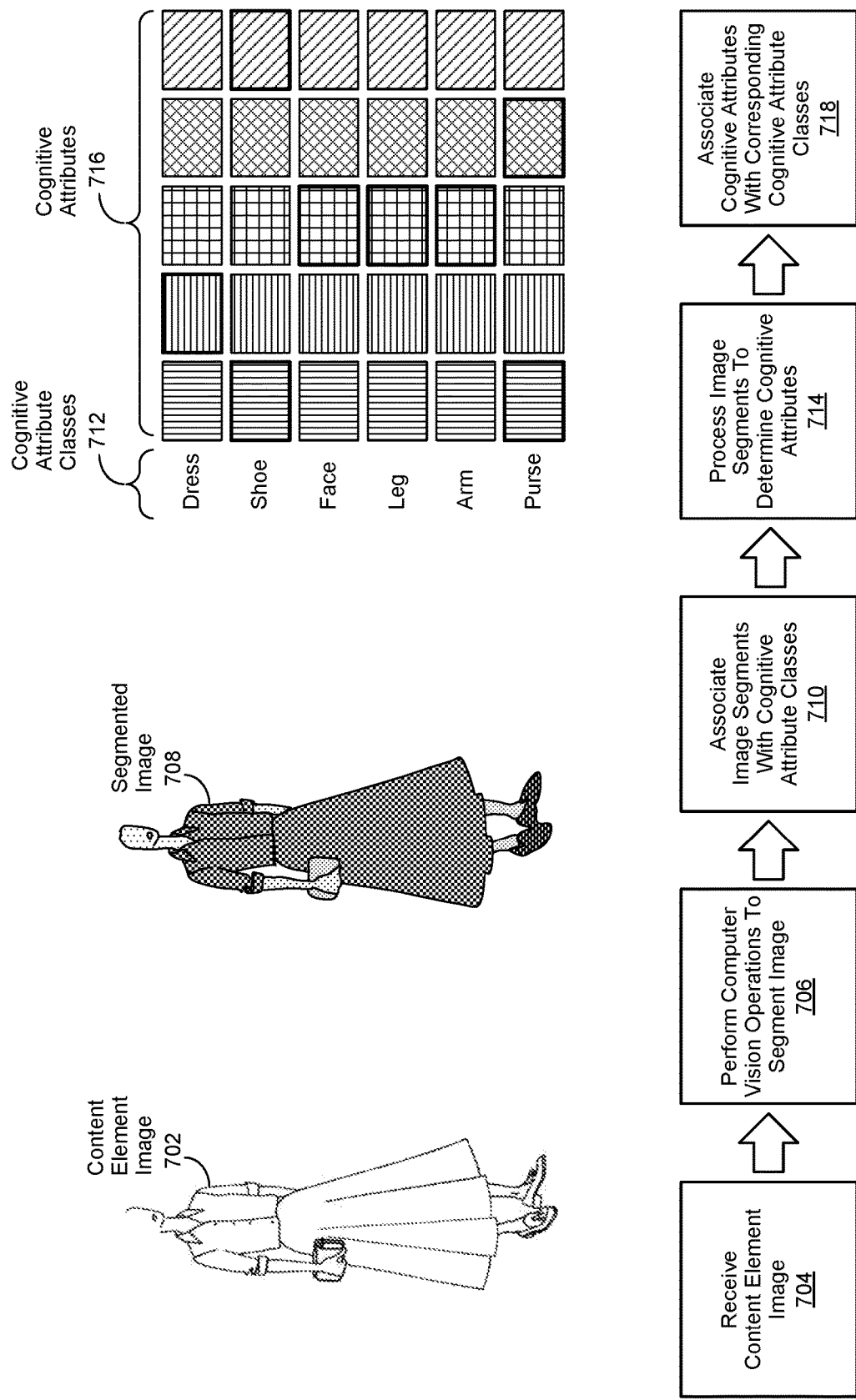
FIG. 7 is a simplified block diagram of the performance of computer vision operations to generate cognitive attributes associated with a content element.

FIG. 7 is a simplified block diagram of the performance of computer vision operations implemented in accordance with an embodiment of the invention to generate cognitive attributes associated with a content element. As used herein, computer vision operations broadly refer to various approaches for acquiring, processing, and analyzing a digital image to generate associated quantitative, qualitative, symbolic, semantic, or descriptive information. In certain embodiments, the digital image may be a graphical image, a photographic image, a video stream, or a combination thereof. As likewise used herein, a cognitive attribute broadly refers to an attribute associated with a content element used to generate a cognitive insight. Likewise, a content element, as used herein, broadly refers to an element of a corpus of content. In various embodiments, as described in greater detail herein, a content element may include a document, a text, an image, an audio recording, a video recording, a stream of media, a social media post, a database element, various kinds of metadata associated with the foregoing, or some combination thereof.

In various embodiments, the association of a cognitive attribute with a particular content element may be performed explicitly, implicitly, or a combination thereof. As an example, a user may curate a digital image by manually associating one or more cognitive attributes. As another example, natural language processing (NLP) operations may be performed on a body of text (e.g., news articles, academic publications, product documentation and descriptions, user reviews, social media posts, etc.) to automatically extract or generate one or more cognitive attributes.

In this embodiment, a content element 702 image is received 704, followed by the performance of computer vision processing 706 operations to generate a segmented image 708. Individual segments of the resulting segmented image 708 are then associated 710 with one or more cognitive attribute classes 712. Each image segment is then processed 714 to determine its respective cognitive attributes 716, which in turn are associated with the image segment's corresponding cognitive attribute classes 712.

As an example, the content element 702 image may be a digital image of a woman wearing a dress. In this example, as shown in FIG. 7, the woman may also be wearing a pair of shoes and holding a purse. As a result of performing the computer vision processing 706 operations, individual segments of the segmented image 708 are associated with corresponding cognitive attribute classes 712 such as "dress," "shoe," "face," "leg," "arm," and "purse." In various embodiments, the cognitive attributes 716 associated with each cognitive attribute class 712 may include color, shape (e.g., round, oval, rectangular, etc.), texture (e.g., rough, smooth, pebbled, etc.), material (e.g., cloth, wood, metal, etc.), and so forth.

To continue the example, the "dress" segment of the segmented image 708 may be determined to have a color attribute of "blue," or "gray and white." Likewise, it may be determined that the "purse" and "shoe" segments have the color attribute of "brown." However, the "purse" and "shoe" segments may also respectively have the material attribute of "cloth" and "leather." In further continuance of the example, the "face," "arm," and "leg" segments may all share an attribute suggesting a "fair" complexion. Skilled practitioners of the art will recognize that many such embodiments and examples are possible. Accordingly, the foregoing is not intended to limit the spirit, scope or intent of the invention.

FIG. 8 shows the display of a content element image, related descriptive information, and corresponding cognitive attributes within a user interface (UI) implemented in accordance with an embodiment of the invention. In various embodiments, the content element image 806 may itself be a content element, described in greater detail herein. As an example, the content element image 806 may be a digital image such as a photograph, an illustration, or a frame from a video recording. In certain embodiments, the content element image 806 may be an image depicting a content element. For example, the content element may be a text describing a floor-length, midnight blue, evening gown. In this example, the content element image 806 may be an image of the actual content element, a stylized image of the content element, a generic image representing the content element, or some combination thereof.

In certain embodiments, computer vision operations may be performed on the content element image 806 to generate associated descriptive information 808. In one embodiment, the descriptive information 808 associated with the content element image 806 may be manually generated by one or more users. In certain embodiments, natural language processing (NLP) approaches familiar to those of skill in the art may be implemented to process the descriptive information 810 to generate one or more cognitive attributes 812. In various embodiments, NLP approaches may likewise be implemented to process additional information related to the content element image 806, such as a user review 810, to generate one or more cognitive attributes 812. In certain embodiments, computer vision operations may be performed on the content element image 806 to generate one or more cognitive attributes 812.

In various embodiments, individual cognitive attributes 812 may be associated with certain cognitive attribute classes, described in greater detail herein. As an example, the cognitive attribute classes associated with the content element image 806 shown in FIG. 8 may include "styles,"

length," "sleeves," "color," "material," "features," embellishments," "accessories," "body shape," and "occasions." In these embodiments, the cognitive attribute classes and cognitive attributes 812 may be displayed within one or more windows 804 of a UI 802. In certain embodiments, the determination of which cognitive attribute classes and cognitive attributes 812 to display is a matter of design choice. As an example, a determination may be made to not display certain cognitive attributes 812 occurring less frequently than others. Those of skill in the art will recognize that many such embodiments and examples are possible. As an example, different industries may commonly use different cognitive attributes and cognitive attribute classes. To continue the example, the industrial fastener industry may commonly use cognitive attributes such as "fastener material," "head type," "length," "diameter," "thread pitch" and so forth. Accordingly, the foregoing is not intended to limit the spirit, scope or intent of the invention.

Figure 9:
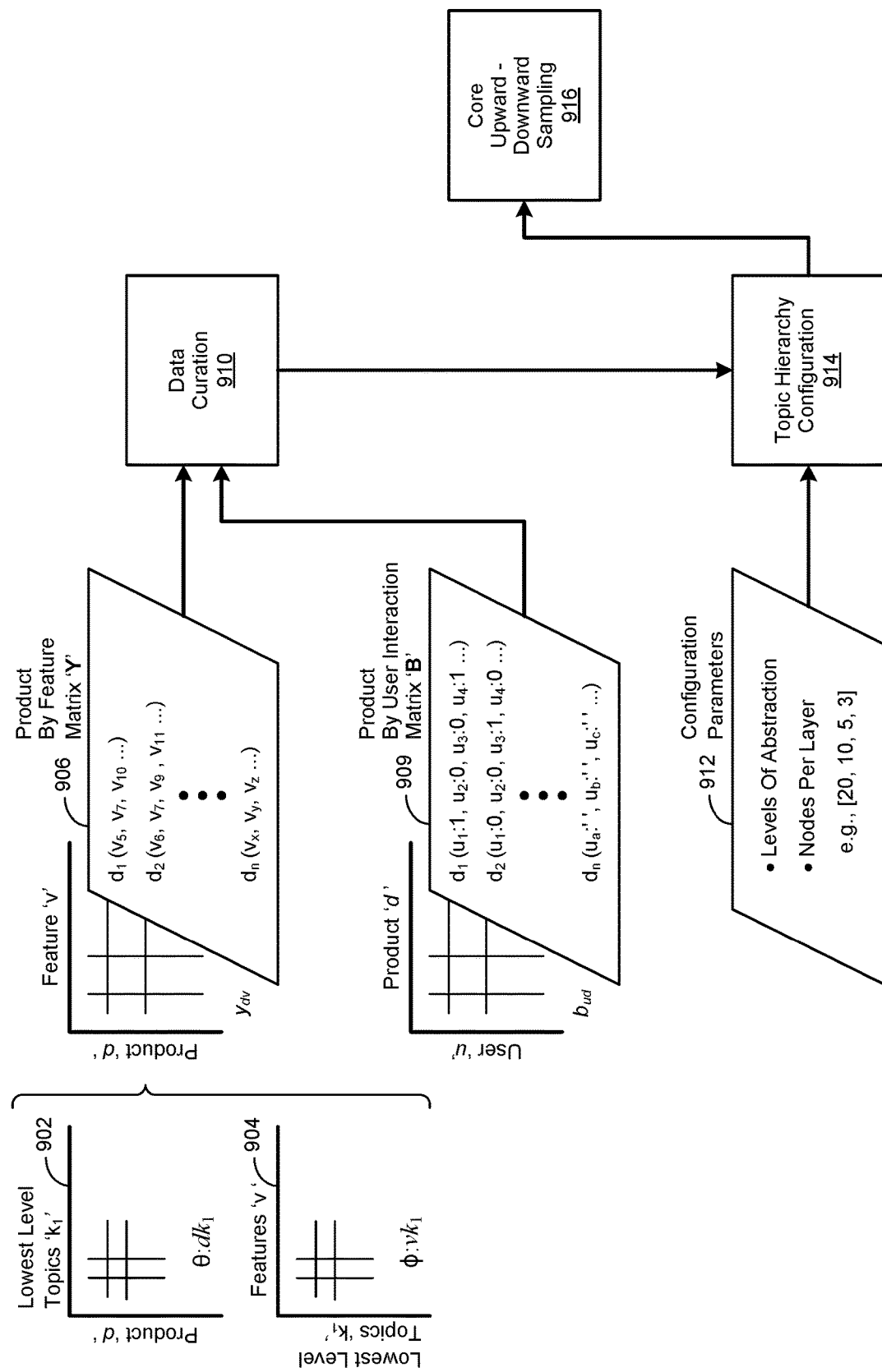
FIG. 9 is a simplified process flow diagram of the performance of cognitive machine learning operations for generating a hierarchical abstraction of topics within a corpus.

FIG. 9 is a simplified process flow diagram of cognitive machine learning operations performed in accordance with an embodiment of the invention to generate a hierarchical abstraction of topics within a corpus. In various embodiments, a cognitive inference and learning system (CILS) utilizes a cognitive machine learning algorithm, as described in greater detail herein, to perform the cognitive machine learning operations. In various embodiments, data curation 910 operations are performed on a corpus, such as a product catalog, to generate a product-by-feature matrix 'Y' 906 and a product-by-user-interaction matrix 'B' 908. As used herein, a feature broadly refers to an attribute, such as a cognitive attribute, described in greater detail herein. Likewise, a user interaction broadly refers to any interaction a user may have with a given product. As an example, a user may select a particular product from three candidate products, each of which has a different set of associated features, displayed on a web page. In this example, the user interaction is the user's act of selecting the chosen product according to its associated features.

In these embodiments, each row of the product-by-feature matrix 'Y' 906 represents a particular product d and each column corresponds to a particular feature v associated with that product d. Likewise, each row of the user-interaction-by-product matrix 'B' 908 represents a particular user u and each column corresponds to a particular product d associated with that that user's interaction v. As an example, the first row of the product-by-feature matrix 'Y' 906 may include product $d_1$, which is associated with features $v_5$, $v_7$, $v_{10}$, and so forth. Likewise, the second row of the product-by-feature matrix 'Y' 906 may include product $d_2$, which is associated with features $v_6$, $v_7$, $v_{11}$, and so forth. To continue the example, the first row of the user-interaction-by-product matrix 'B' 908 may likewise include product $d_1$, which is associated with users $u_1$:1, $u_2$:0, $u_3$:0, $u_4$:1 and so forth. Likewise, the second row of the product-by-feature matrix 'Y' 906 may include product $d_2$, which is associated with users $u_1$:0, $u_2$:0, $u_4$:0 and so forth. To further continue the example, the use of a '1' denotes a user's interaction with the product and the use of a '0' denotes the absence of a user's interaction.

As another example, a skillet may be a product that has a corresponding feature of being "non-stick." In certain embodiments, a feature has a one-to-one association with its corresponding product, yet different products may have the same feature. To continue the example, the afore-mentioned skillet and a saucepan may be different products, yet both may have the corresponding feature of being "non-stick." Likewise, the skillet may have a feature of being ten inches in diameter while the saucepan may have a feature of eight inches in diameter. In further continuance of the example, a user may perform a user interaction with the skillet, such as selecting it as a candidate purchase on a web page, but not performing a similar user interaction with the saucepan.

In certain embodiments, the product-by-feature matrix 'Y' 906 may be implemented as a document-by-word matrix. In these embodiments, each row in the product-by-feature matrix 'Y' 906 represents a particular document and each word corresponds to a term associated with that document. In various embodiments, term counts may be implemented to determine their frequency in the document-by-word matrix. Those of skill in the art will recognize that many such embodiments and examples of products, documents, features, terms, and user interactions are possible. According, the foregoing is not intended to limit the spirit, scope or intent of the invention.

As shown in FIG. 9, the dimensions of the product-by-feature matrix 'Y' 906 can be expressed as $y_{dv}$ and the dimensions of the user-interaction-by-feature matrix 'B' 908 can be expressed as $b_{ud}$. Likewise, the indexing of the product-by-feature matrix 'Y' 906 can be represented by $y_{dw}$ where d is a particular product and v is a particular feature. Likewise, the indexing of the product-by-user interaction matrix 'B' 904 is represented by $b_{ud}$ where u is a particular user and d is a particular product.

In certain embodiments, the product-by-feature matrix 'Y' 906 may be decomposed as the product of two matrices. The first matrix, referenced as θ, is a product-by-lowest-level-topics matrix 902. The second matrix, referenced as φ, is a feature-by-lowest-level-topics matrix 904. In these embodiments, the dimension of theta θ can be expressed as $\theta:dk_1$ and the dimension of φ can be expressed as $\phi:vk_i$, where $k_1$ represents the number of topics in the first level of a given hierarchy, which as described in greater detail herein, is also its lowest level of abstraction.

Accordingly, $Y \sim \theta^{(1)} \phi^{(1)}$, $B \sim \beta A \phi^{(1)}$, and $\beta:u\overline{K}$, where β denotes a user's association with one or more types of users, such as various cognitive personas, described in greater detail herein. Likewise, A denotes the mapping between various product clusters and various types of users, and $\overline{K}$ denotes the total number of unique users. By extension, an individual user that is associated with a particular type of user is likely to prefer a certain group of products. As an example, an individual user who is associated with a group of users who are machinists may have a preference for stainless steel machine screws. In contrast, an individual user who is associated with a group of users who are woodworkers may have a preference for brass wood screws. In this example, "stainless steel" and "machine" are features that machinists prefer, while "brass" and "wood" are features that woodworkers prefer.

Once data curation 910 operations are completed, configuration parameters 912 are received, which are in turn used to perform topic hierarchy configuration 914 operations. In various embodiments, the configuration parameters may include a target number of levels of abstraction for a given hierarchy, along with a target number of nodes for each level of the hierarchy. As an example, the hierarchy may be defined as having 20 nodes in its lowest level, 10 in its second, 5 in its third, and 3 in its fourth. In this example, the dimension of θ for the lowest level of abstraction is defined as $\theta^{(1)}:d$ 20, and the dimension of φ is defined as $\phi^{(1)}:$ 20 v, where '20' is the number of nodes in the lowest level of abstraction in the hierarchy. Likewise, the dimension of θ for the second lowest level of abstraction is defined as $\theta^{(2)}:d$ 10, and the dimension of φ is defined as $\phi^{(2)}:$ 10 v, where '10' is the number of nodes in the second lowest level of abstraction in the hierarchy. The process is then continued, level by level of the hierarchy, until the highest-defined level of abstraction, such as the fourth level, of the hierarchy is reached.

As used herein, a node broadly refers to either an individual topic or a cluster of topics. As likewise used herein, a topic broadly refers to a statistical distribution of associated attributes, such as cognitive attributes. In certain embodiments, a topic may be a product, such as that found in a product catalog, and its associated attributes may be features of the product, such as its color, size or shape. In various embodiments, the topic may be a document in a corpus of content and its associated attributes may be terms it contains. In certain embodiments, the affinity of individual attributes to a given topic is defined by a probability vector with each feature representing a certain affinity score between '0' and '1'. In various embodiments, each topic has an affinity towards a given node. However, in certain of these embodiments, this score is not bounded between '0' and '1'. Instead, it can be any non-negative value.

As an example, a bolt and a machine screw may have a particular type of thread that is different. Likewise, the bolt may have a hex head, while the machine screw may have a slotted head. As such, even though they may have features that are completely discrete from one another, they both have a strong affinity to the topic of "threaded fasteners." However, both the bolt and machine screw may also have a "diameter" feature, which could be the same dimension. In this example, the feature of "diameter" could have an affinity to the topics of both "threaded fasteners," such as bolts and machine screws, and "non-threaded fasteners," such as cotter pins or pop rivets. Once topic hierarchy configuration 914 operations are completed, then core upward-downward sampling operations, described in greater detail herein, are performed.

Figure 10:
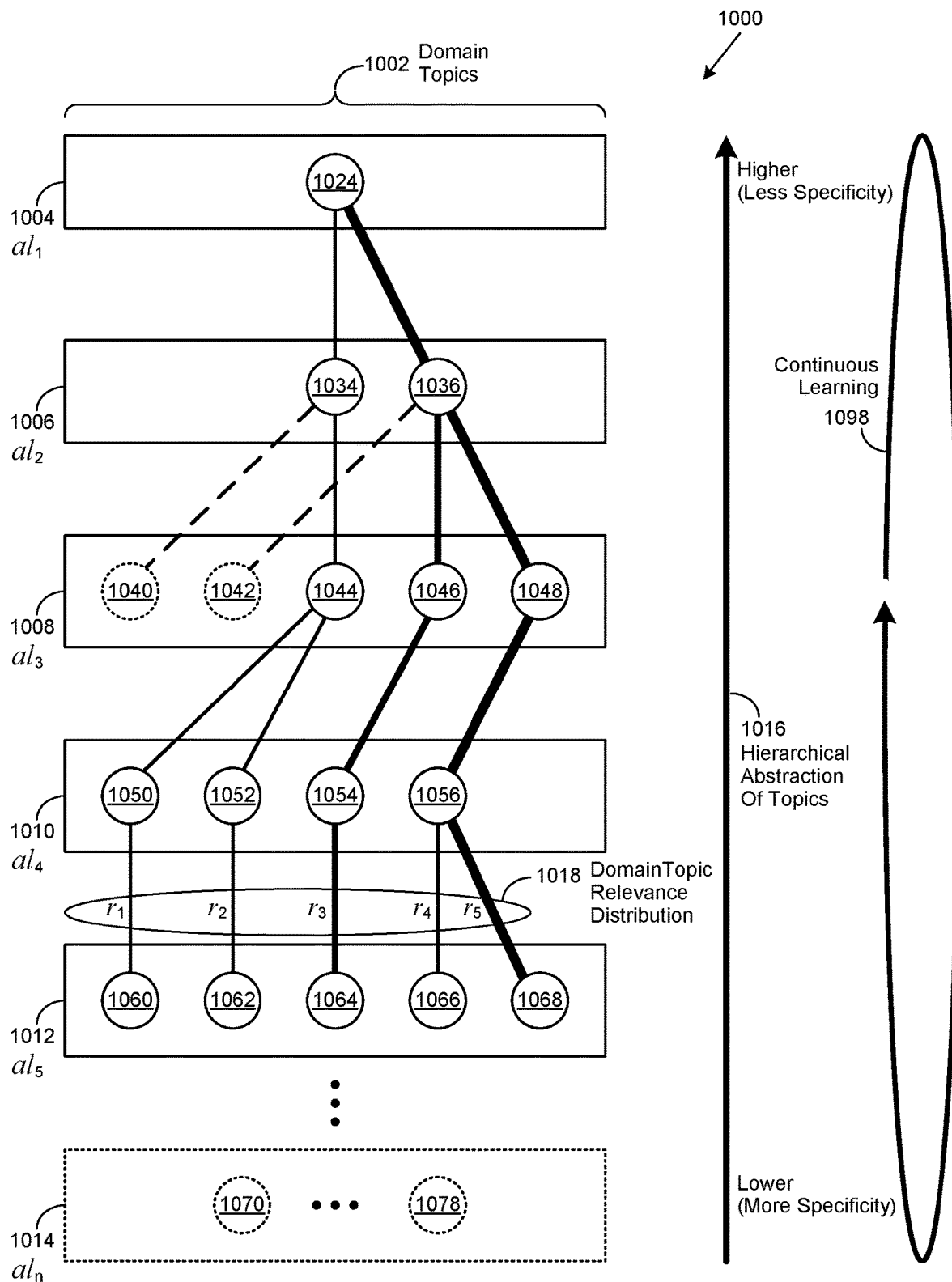
FIG. 10 is a simplified block diagram of the generation of a hierarchical abstraction of topics within a corpus.

FIG. 10 is a simplified block diagram of cognitive machine learning operations performed in accordance with an embodiment of the invention to generate a hierarchical abstraction of topics within a corpus. In various embodiments, a cognitive inference and learning system (CILS) utilizes a cognitive machine learning algorithm, as described in greater detail herein, to perform the cognitive machine learning operations. In certain embodiments, the cognitive machine learning algorithm may be implemented as a domain topic abstraction algorithm. In these embodiments, the hierarchical abstraction of topics 1016 is generated by applying the domain topic abstraction algorithm to a corpus of content associated with a particular domain of information.

In various embodiments, the hierarchical abstraction of topics 1016 is generated in the form of a hierarchical topic model 1000. In certain embodiments, the hierarchical topic model 1000 is implemented in the form of an abstraction hierarchy, described in greater detail herein. In various embodiments, the corpus of content may include a collection of documents, a text, an image, an audio recording, a video recording, a stream of media (e.g., newsfeeds), a social media post, database elements, various kinds of metadata associated with the foregoing, or some combination thereof.

As used herein, a topic broadly refers to a statistical distribution of associated attributes. In certain embodiments, a topic may be a product, such as that found in a product catalog, and its associated attributes may be features of the product. In various embodiments, the topic may be a document in a corpus of content and its associated attributes may be the terms it contains. In certain embodiments, a topic may also broadly refer to something that is being discussed, or illustrated, within a given subset of a corpus, such as a phrase, an image, or a sound. In these embodiments, the difference between a topic and a grammatical subject is that a topic is used to describe the information structure of a clause and how it coheres with other clauses, whereas a subject is a grammatical category. Furthermore, both a topic and a grammatical subject are distinguished from an actor, or agent, which is the "doer" within a particular subset of a corpus. Moreover, while a topic is typically the subject, the agent may be omitted or follow the preposition "by" in English clauses with a verb in the passive voice.

As likewise used herein, an algorithm broadly refers to a predetermined set of rules for conducting computational steps that produce a computational effect. Likewise, as used herein, a programming model ("model") broadly refers to a framework for expressing algorithms, but is not an algorithm itself. For example, an algorithm may provide a predetermined set of rules, or computational operations, for carrying out the steps to produce an outcome. In contrast, a programming model does not describe how to carry out steps to solve an actual problem. Instead, it provides a framework for expressing algorithms to do so.

A topic model, as used herein, broadly refers to a statistical model implemented to discover abstract topics occurring within a corpus. Skilled practitioners of the art will be familiar with various topic modeling approaches, which are frequently used in text mining for discovering hidden or non-obvious semantic structures within a body of text. As an example, certain words in a document about a particular topic may occur more frequently than others. To continue the example, words such as "nuts" and "bolts" are more likely to occur in a document whose primary topic is related to threaded fasteners. Likewise, words such as "steel" and "aluminum" are more likely to occur in a document whose primary topic is related to the properties of certain metals. To further continue the example, a document is typically associated with various topics in different proportions. Consequently, a document that is 20% about the properties of certain metals and 80% about their use in fasteners would likely contain four times as many fastener-related words than metal-related words.

Accordingly, the resulting clusters, or nodes, of similar words in such models represent the various topics within a given document. In various embodiments, a topic model is implemented as a mathematical framework, and based upon the statistical distribution of words within each, not only discovers each topic in a document, but also their relative concentration and distribution. Topic models are also known to be referred to as probabilistic topic models, which broadly refer to statistic algorithms used for discovering latent semantic structures within an extensive body of text, such as a corpus of content.

As used herein, domain topic abstraction broadly refers to knowledge elements of an information domain organized in an abstraction hierarchy or taxonomy, where instances of knowledge elements in proximate classes are similar. As such, an abstraction hierarchy broadly refers to a grouping principle, whereby a hierarchy is adhered to with higher levels of abstraction placed near the top of the hierarchy and more specific concepts are placed lower down. Likewise, as used herein, a taxonomy broadly refers to a classification of things, knowledge elements, or concepts associated with a certain domain of information, as well as the principles underlying such a classification.

In various embodiments, a particular taxonomy may be implemented to support relationship schemes other than parent-child hierarchies, such as network structures. In certain embodiments, these network structures may include various cognitive graphs, described in greater detail herein. In these embodiments, one or more taxonomies may be implemented to include single children with multiple parents. As an example, "bolt" may appear within a network structure with parents that include "fasteners," "connectors," and so forth.

Skilled practitioners of the art will be aware that taxonomies are generally considered to be narrower than ontologies within the discipline of knowledge management, as ontologies typically apply to a larger variety of relation types. Those of skill in the art will likewise be aware that a hierarchical taxonomy, within the field of mathematics, is typically considered a tree structure of classifications for a given set of objects. As such, it is also commonly referred to as a containment hierarchy. At the top of such structures is a single classification, the root node, which applies to all objects below it. More particularly, subordinate tiers of nodes in the hierarchy contain progressively more detailed classifications associated with various subsets of a total set of classified objects. Accordingly, the classification of objects proceeds from being more general towards the top of the hierarchy to being more specific towards its lower levels.

As likewise used herein, a hierarchical topic model 1000 broadly refers to an algorithmic approach to discovering topics occurring within a corpus, determining their respective degree of abstraction, and structuring them accordingly into a hierarchy. In various embodiments, higher levels of abstraction for a particular topic are placed near the top of the hierarchy and more specific levels of abstraction are placed lower in the hierarchy. In certain embodiments, a topic's level of abstraction, and its associated placement within a hierarchy, is discovered automatically. In various embodiments, the resulting hierarchy is generated in a taxonomic form familiar to those of skill in the art.

Referring now to FIG. 10, a corpus of content is processed to identify a set of domain topics 1002, which in various embodiments are hierarchically abstracted 1016 into a hierarchical topic model 1000, described in greater detail herein. In these embodiments, domain topics 1002 that have a higher degree of abstraction, or less specificity, are hierarchically abstracted 1016 into the upper levels of the hierarchical topic model 1000. Likewise, domain topics having a lesser degree of abstraction, or more specificity, are hierarchically abstracted 1016 into lower levels. As an example, the domain topic 1024 in abstraction level $al_1$ 1004 in the hierarchical topic model 1000 has a higher degree of abstraction, or less specificity, than domain topics 1034 and 1036 in abstraction level $al_2$ 1006. Likewise, the domain topics 1050, 1052, 1054, and 1056 in abstraction level $al_4$ 1012 have a lower degree of abstraction, or more specificity, than domain topics 1040, 1042, 1044, 1046, and 1048 in abstraction level $al_3$ 1008. To continue the example, domain topics 1060, 1062, 1064, 1066, and 1068 in abstraction level $al_5$ 1012 have a higher degree of abstraction, or less specificity, than domain topics 1070 through 1078 in abstraction level $al_n$ 1014, and so forth.

In various embodiments, individual domain topics 1002 are automatically identified and hierarchically abstracted 1016 into a corresponding abstraction level, such as abstraction levels $al_1$ 1004, $al_2$ 1006, $al_3$ 1008, $al_4$ 1010, $al_5$ 1012, and $al_n$ 1014 shown in FIG. 10, according to their associated attributes. In certain embodiments, the associated attributes include cognitive attributes, described in greater detail herein. In one embodiment, attributes associated with a particular domain topic 1002 are in the form of data elements stored in a database, such as a relational database. In another embodiment, the attributes are in the form of knowledge elements stored in a knowledge repository, such as a cognitive graph. In yet another embodiment, the attributes are in the form of metadata. In yet still another embodiment, the attributes are derived from processing image, video or audio data. In one embodiment, the attributes are derived from social media data associated with a particular set of users. Skilled practitioners of the art will recognize that many such examples of domain topic 1002 attributes are possible. Accordingly, the foregoing is not intended to limit the spirit, scope or intent of the invention.

As an example, a manufacturer of industrial fasteners may have tens-of-thousands of individual products in their product line, each with various attributes such as length, diameter, width, thread characteristics, head type, grades and materials, mechanical properties, prices, and so forth. In this example, domain topics 1070 through 1078 in abstraction level $al_m$ 1014 may be the lowest level of abstraction within the hierarchical topic model 1000 that includes all products having attributes of both "screw" and "metal." To continue the example, the application of a domain topic abstraction algorithm, described in greater detail herein, to the domain topics 1070 through 1078 in abstraction level $al_n$ 1014 may result in the hierarchical abstraction of domain topics 1060, 1062, 1064, 1066, and 1068 into abstraction level $al_5$ 1012. In continuance of the example, domain topics 1060 and 1062 may respectively relate to wood screws and machine screws manufactured from brass. Likewise, domain topic 1064 may relate to stainless steel machine screws, while domain topics 1066 and 1068 may respectively relate to zinc-plated steel wood screws and machine screws.

In further continuance of the example, the domain topic abstraction algorithm may be applied to domain topics 1060, 1062, 1064, 1066, and 1068 in abstraction level $al_5$ 1012, resulting in the hierarchical abstraction of domain topics 1050, 1052, 1054, and 1056 into abstraction level $al_4$ 1010. To continue the example, domain topics 1050 and 1052 may respectively relate to brass wood screws and machine screws. Likewise, domain topic 1054 may relate to stainless steel machine screws, while domain topics 1056 may relate to zinc-plated steel screws of different types.

To continue the example, the domain topic abstraction algorithm may then be applied to domain topics 1050, 1052, 1054, and 1056 in abstraction level $al_4$ 1010, resulting in the hierarchical abstraction 1016 of domain topics 1044, 1046, and 1048 into abstraction level $al_3$ 1008. To continue the example further, domain topics 1044, 1046 and 1048 may respectively relate to screws of various types manufactured from brass, stainless steel, and zinc-plated steel. Likewise, domain topics 1040 and 1042 may respectively relate to various types of threaded fasteners manufactured from nylon and wood, which are abstracted from other domain topics 1002 not shown in FIG. 10.

To further continue the example, the domain topic abstraction algorithm may then be applied to domain topics 1040, 1042, 1044, 1046, and 1048 in abstraction level $al_3$ 1008, resulting in the hierarchical abstraction of domain topics 1034 and 1036 in abstraction level $al_2$ 1006. In further continuance of the example, domain topics 1034 and 1036 in abstraction level $al_2$ 1006 may respectively relate to threaded fasteners manufactured from various types of brass and steel, whether zinc-plated steel or stainless steel. To continue the example even further, the domain topic abstraction algorithm may once again be applied to domain topics 1034 and 1036 in abstraction level $al_2$ 1006, which results in the hierarchical abstraction of domain topic 1024 in level $al_1$ 1004. To complete the example, the domain topic 1024 in level $al_1$ 1004 may relate to threaded fasteners of various kinds, as opposed to various types of non-threaded fasteners, such as pop rivets and cotter pins.

In certain embodiments, domain topics are hierarchically abstracted 1016 from lower levels of the hierarchical topic model 1000 according to their domain topic relevance distribution 1018. As used herein, domain topic relevance distribution 1018 broadly refers to the statistical occurrence of a particular domain topic 1002 within a corpus of content. In various embodiments, the domain topic relevance distribution 1018 for a particular domain topic 1002 associated with a particular abstraction level, such as $al_1$ 1004, $al_2$ 1006, $al_3$ 1008, $al_4$ 1010, $al_5$ 1012, and $al_n$ 1014, is assigned a corresponding domain topic relevance distribution 1018 value, such as $r_1$, $r_2$, $r_3$, $r_4$, and $r_5$.

For example, domain topics 1068 and 1066 may share a common attribute, such as both being related to screws manufactured from zinc-plated steel, yet they may have certain distinct attributes, such as respectively being related to wood screws and machine screws. Likewise, the statistical occurrence of domain topic 1068 is higher than that of domain topic 1066. Accordingly, as depicted in FIG. 10, the domain topic relevance distribution 1018 value $r_5$ assigned to domain topic 1068 is higher than the domain topic relevance distribution 1018 value $r_4$ assigned to domain topic 1066. In one embodiment, the domain topic relevance distribution 1018 values associated with any given abstraction level are normalized to sum to a value of 1.0. As an example, the domain topic relevance distribution 1018 values respectively associated with domain topics 1060, 1062, 1064, 1066 and 1098 in abstraction level $al_5$ 1012 may be 0.1, 0.1. 0.3, 0.1 and 0.4.

In various embodiments, continuous learning operations 1098 are performed by iteratively applying a domain topic abstraction algorithm to a corpus of content. In certain embodiments, the continuous learning operations 1098 are performed through the use of upwards-downwards Gibbs sampling, described in greater detail herein. In various embodiments, the hierarchical topic model 1000 is implemented as an augmented Gamma Belief Network (GBN), likewise described in greater detail herein. In these embodiments, the number of iterations used when applying the domain abstraction level is a matter of design choice.

In certain embodiments, user input is processed to determine the number of abstraction levels, and the number of domain topics 1002 each contains. In these embodiments, the number of abstraction levels, and the number of domain topics 1002 each contains, is a matter of design choice. Those of skill in the art will recognize that many such embodiments and examples are possible. Accordingly, the foregoing is not intended to limit the spirit, scope or intent of the invention.

Figure 11:
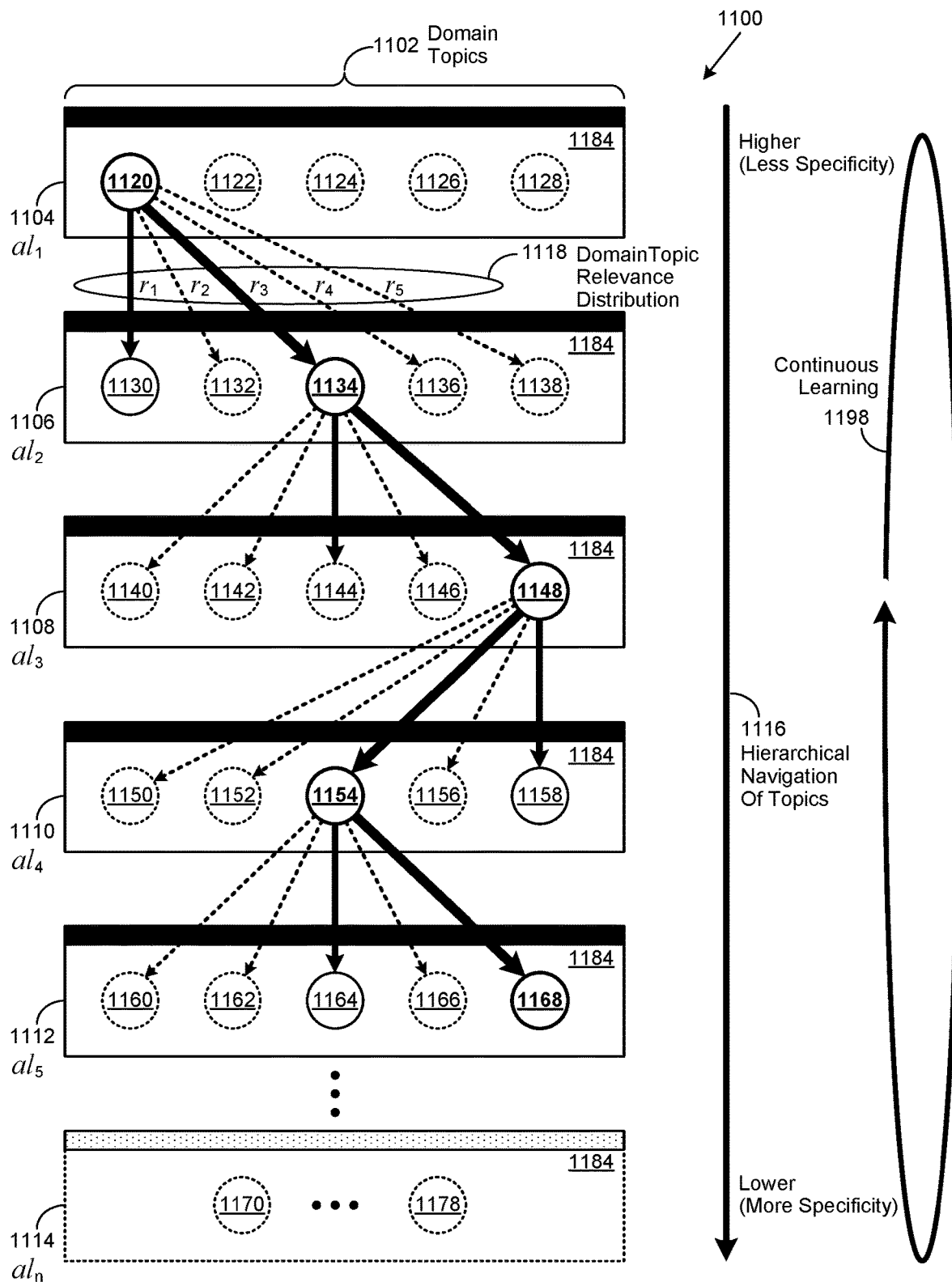
FIG. 11 is a simplified block diagram of the navigation of a hierarchical abstraction of topics within a corpus.

FIG. 11 is a simplified block diagram of cognitive machine learning operations performed in accordance with an embodiment of the invention to navigate a hierarchical abstraction of topics within a corpus. In various embodiments, a cognitive inference and learning system (CILS) utilizes a cognitive machine learning algorithm, as described in greater detail herein, to perform cognitive machine learning operations. In certain embodiments, the cognitive machine learning algorithm may be implemented as a hierarchical topic navigation algorithm.

In various embodiments, the hierarchical abstraction of topics is implemented in the form of a hierarchical topic model 1100, described in greater detail herein. In certain embodiments, the hierarchical topic model is implemented in the form of an abstraction hierarchy, likewise described in greater detail herein. In various embodiments, the corpus of content may include a collection of documents, a text, an image, an audio recording, a video recording, streaming media (e.g., newsfeeds), a social media post, database elements, various kinds of metadata associated with the foregoing, or some combination thereof.

In these embodiments, the hierarchical topic navigation algorithm is implemented to assist various classes of users, or user types, to hierarchically navigate 1116 a particular hierarchical topic model 1100. In one embodiment, the user type is associated with a cognitive persona, described in greater detail herein. In another embodiment, the user is uniquely associated with a cognitive profile, also referred to as "a profile of one," likewise described in greater detail herein. In these embodiments, the method by which an individual user is determined to be associated with a given cognitive persona or cognitive profile, and by extension, a particular hierarchical topic model 1100, is a matter of design choice.

Referring now to FIG. 11, a hierarchical topic model 1100 is processed to identify a set of domain topics 1102 associated with the highest abstraction level associated with a particular domain of information. In various embodiments, the domain of information is determined by processing a user query or declarative statement. In certain embodiments, the resulting set of domain topics 1102 associated with the identified highest abstraction level is presented to a user within a window 1184 of a user interface (UI).

To extend a prior example, a user may want to peruse a large corpus of industrial fasteners to identify the most applicable fastener for a particular need. However, they are not sure which type of type of fastener is best suited for their needs. In this example, the user first submits a query or declarative statement related to industrial fasteners to a CILS. In response, domain topics 1120, 1122, 1124, 1126, and 1126 in abstraction level $al_1$ 1104, which may be the highest level of abstraction for industrial fasteners within the hierarchical topic model 1100, are displayed within the UI window 1184. In continuance of this example, domain topics 1120, 1122, 1124, 1126, and 1128 may respectively relate to threaded fasteners (e.g., screws), non-threaded fasteners (e.g., rivets), conformant fasteners (e.g., cam locks), clips (e.g., retaining rings), and clamps (e.g., hose clamp). To further continue this example, the user may select domain topic 1120, related to threaded fasteners, through the use of a user gesture familiar to those of skill in the art within the UI window 1184.

As a result, the user's selection of domain topic 1120 is used by a hierarchical topic navigation algorithm to determine the next lowest abstraction level for threaded fasteners in the hierarchical topic model 1100. To continue this example, domain topics 1130, 1132, 1134, 1136, and 1138 in abstraction level $al_2$ 1106, which may be the next lowest abstraction level in the hierarchical topic model 1100 that relates to threaded fasteners, are displayed within the UI window 1184. In further continuance of this example, domain topics 1130, 1132, 1134, 1136, and 1138 may respectively relate to bolts, threaded rods, screws, nuts, and threaded anchors of various kinds. To continue this example, the user may select domain topic 1134, related to screws, within the UI window 1184.

Accordingly, the user's selection of domain topic 1134 is likewise used by the hierarchical topic navigation algorithm to determine the next lowest abstraction level in the hierarchical topic model 1100, and its associated domain topics 1102. In continuance of this example, domain topics 1140,

1142, 1144, 1146, and 1148 in abstraction level $al_3$ 1108, which may be the next lowest abstraction level in the hierarchical topic model 1100 that relates to screws, are displayed within the UI window 1184. In further continuance of this example, domain topics 1140, 1142, 1144, 1146, and 1148 may respectively relate to bolts, threaded rods, screws, nuts, and machine screws. To continue this example, the user may likewise select domain topic 1148, related to machine screws, within the UI window 1184.

As before, the user's selection of domain topic 1148 is then used by the hierarchical topic navigation algorithm to determine the next lowest abstraction level of the hierarchical topic model 1100, and its associated domain topics 1102. To further continue this example, domain topics 1150, 1152, 1154, 1156, and 1158 in abstraction level $al_4$ 1110, which may be the next lowest abstraction level in the hierarchical topic model 1100 that relates to machine screws, are displayed within the UI window 1184. In further continuance of this example, domain topics 1150, 1152, 1154, 1156, and 1158 may respectively relate to machine screws made from brass, zinc-plated steel, stainless steel, hardened steel, and nylon. In this example, the user may then select domain topic 1154, related to machine screws made from stainless steel, within the UI window 1184.

Once again, the user's selection of domain topic 1154 is used by the hierarchical topic navigation algorithm to determine the next lowest abstraction level of the hierarchical topic model 1100, and its associated domain topics 1102. To continue this example, domain topics 1160, 1162, 1164, 1166, and 1168 in abstraction level $al_5$ 1112, which may be the next lowest abstraction level in the hierarchical topic model 1100 that relates to machine screws made from stainless steel, are displayed within the UI window 1184. To further continue this example, domain topics 1160, 1162, 1164, 1166, and 1168 may respectively relate to round head, oval head, pan head, truss head, and flat head stainless steel machine screws. To continue this example further, the user may select domain topic 1168, related to flat head stainless steel machine screws, within the UI window 1184.

Accordingly, the user's selection of domain topic 1168 is once again used by the hierarchical topic navigation algorithm to determine the next lowest abstraction level of the hierarchical topic model 1100, and its associated domain topics 1102. To complete this example, domain topics 1170 through 1178 in abstraction level $al_6$ 1114, which may be the next lowest abstraction level in the hierarchical topic model 1100 that relates to flat head machine screws made from stainless steel, are displayed within the UI window 1184. The process is then repeated until the user has navigated 1116 the hierarchical topic model 1100 to the abstraction level that contains domain topics 1102 with sufficient specificity to satisfy their needs.

In various embodiments, the number of abstraction levels, and the number of domain topics 1102 each contains, is determined by the domain topic relevance distribution 1118 value, such as $r_1$, $r_2$, $r_3$, $r_4$, and $r_5$, associated with each domain topic 1102 within a particular abstraction level. In these embodiments, the domain topic relevance distribution 1118 value that qualifies a particular domain topic 1002 for inclusion within a particular abstraction level is a matter of design choice. In certain embodiments, the number of abstraction levels, and the number of domain topics 1102 each contains, is user-defined. In various embodiments, the number of domain topics 1102 a user may select within a UI window 1184 likewise user-defined. In these embodiments, the number of abstraction layers, or the number of domain topics 1102 each contains, is a matter of design choice.

In various embodiments, domain topics 1102 are iterative presented to a user in a gamified context as the hierarchical topic model 1100 is navigated. As an example, the user may receive points for each selection they make. In this example, the points may be redeemed if the user makes a purchase. As another example, interesting facts or trivia associated with a given domain topic 1102 may be provided to the user as the result of the user making a selection. In these embodiments, the method of gamifying the domain topic 1102 selection process, and the method by which the hierarchical topic model 1100 is navigated, is a matter of design choice. Skilled practitioners of the art will recognize that many such embodiments and examples related to gamification of the domain topic 1102 selection process, and the navigation of the hierarchical topic model 1100, are possible. Accordingly, the foregoing is not intended to limit the spirit, scope or intent of the invention.

In various embodiments, the user's selection of a particular domain topic 1120 in a given level of abstraction within the hierarchical topic model 1100 generates training data. In certain embodiments, the training data is then used as input to a domain topic abstraction algorithm, described in greater detail herein, to generate alternative versions of the hierarchical topic model 1100. In various embodiments, the alternative versions of the hierarchical topic model 1100 are then associated with an individual user or classes of users for subsequent use. As described in greater detail herein, the individual user may be represented by a cognitive persona or a cognitive profile, likewise described in greater detail herein. In certain of these embodiments, the alternative version of the hierarchical topic model is associated with the cognitive persona or a cognitive profile. In various embodiments, continuous learning operations 1198 are performed by iteratively providing training data to the domain topic abstraction algorithm. In these embodiments, the method by which the alternative version of the hierarchical topic model 1100 is associated with the cognitive persona or a cognitive profile, and the method by which the training data is provided to the domain abstraction algorithm, is a matter of design choice.

As an example, a user may be identified as being associated with a certain class of user. Accordingly, the user is presented a particular hierarchical topic model 1100 typically associated with that class of user. As a result, the user may have successively selected domain topics 1120, 1134, 1148, 1154 and 1168, which respectively correspond to threaded fasteners, screws, machine screws, stainless steel machine screws, and flat head stainless steel machine screws. However, the user may have decided thereafter to not navigate 1116 the hierarchical topic model 1100 to any lower abstraction level. Instead, the user navigates 1116 back up to abstraction level $al_4$ 1110, where domain topic 1152, which relates to zinc-plated machine screws, is selected. Additional training data is generated as a result of the selection, which in turn is provided to the hierarchical topic navigation algorithm for processing.

Accordingly, domain topics in a different abstraction level (not shown) are presented to the user. In this example, the domain topics may relate to round head, oval head, pan head, truss head, and flat head zinc-plated steel machine screws. In turn, the user may select the domain topic related to flat head zinc-plated machine screws, only to navigate 1116 once again to abstraction level $al_4$ 1110. Once there, the user may select domain topic 1150, which relates to brass machine screws. As before, additional training data is generated as a result of the user's selection and is provided to the domain topic abstraction algorithm for processing.

Those of skill in the art will recognize that many such embodiments and examples are possible. Accordingly, the foregoing is not intended to limit the spirit, scope or intent of the invention.

Figure 12:
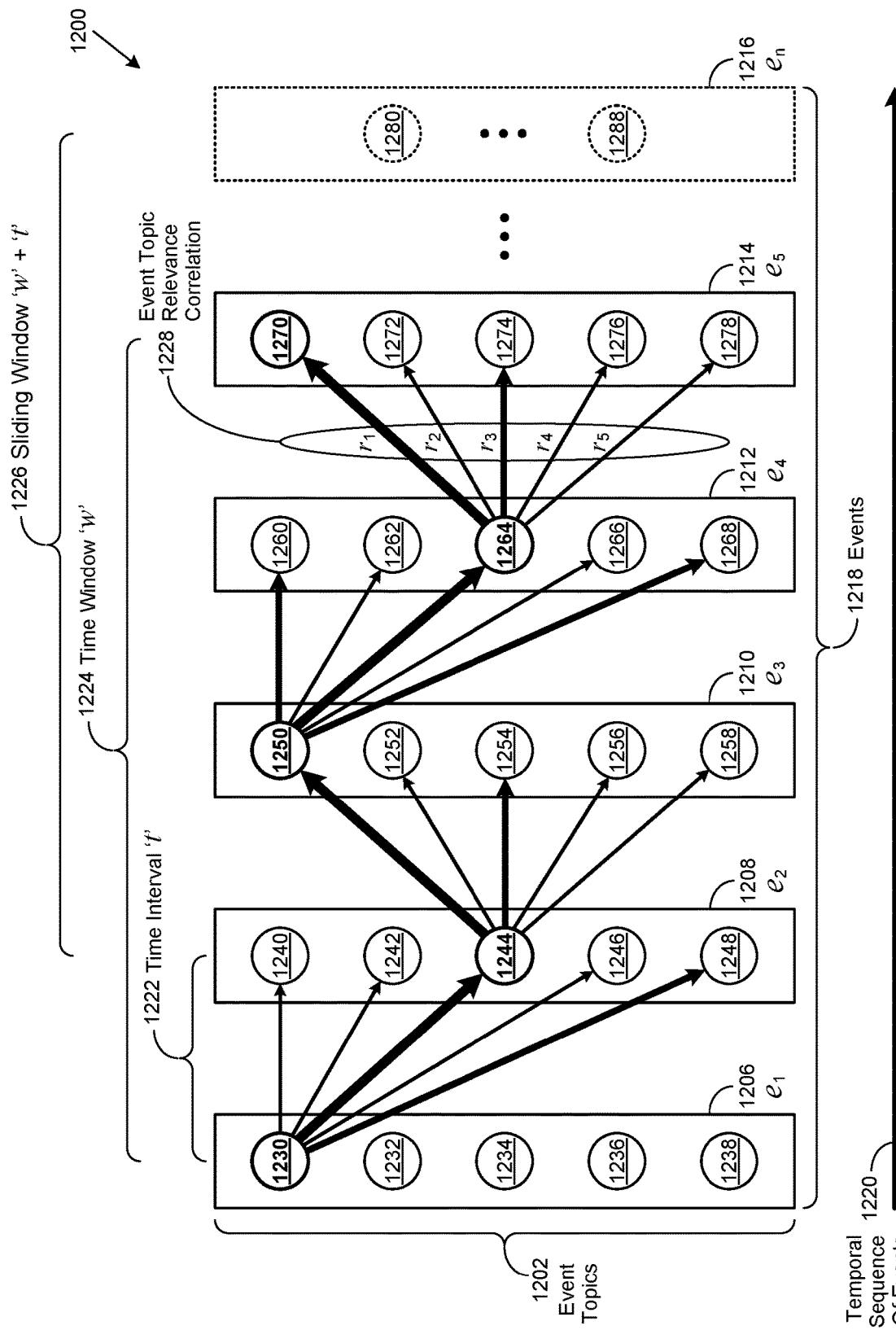
FIG. 12 is a simplified block diagram of cognitive machine learning operations to determine the prevalence of various terms within a corpus of content during a temporal sequence of events.

FIG. 12 is a simplified block diagram of cognitive machine learning operations performed in accordance with an embodiment of the invention to determine the prevalence of various terms within a corpus of content at certain intervals during a temporal sequence of events. In various embodiments, a cognitive inference and learning system (CILS) utilizes a cognitive machine learning algorithm, as described in greater detail herein, to perform the cognitive machine learning operations. In certain embodiments, the cognitive machine learning algorithm may be implemented as a temporal topic discovery algorithm. In various embodiments, the prevalence of various terms during a temporal sequence is determined by iteratively applying the temporal topic discovery algorithm at certain intervals to a corpus of content associated with a particular domain of information. In these embodiments, the corpus of content may include a collection of documents, a text, an image, an audio recording, a video recording, streaming media (e.g., newsfeeds), a social media post, database elements, various kinds of metadata associated with the foregoing, or some combination thereof.

As used herein, a term, as it relates to machine learning operations, broadly refers to a semantic unit within a corpus of content. In certain embodiments, a term may be a word, an image, a phoneme, a data element, or various kinds of metadata associated with any of the foregoing. In various embodiments, a term within a corpus of content may be associated with one or more topics, described in greater detail herein. As an example, the corpus may contain the terms "diesel," "tank," "fuel," "stored," "armored," and "vehicle." Dependent upon the respective prevalence of these terms within the corpus, the primary topic may be "diesel fuel storage" or "diesel-powered armored vehicles."

To continue the example, the corpus may contain a sentence such as, "Diesel fuel, which is commonly used to power a large vehicle, may be stored in an armored storage tank for safety reasons." Likewise, the corpus instead may also contain a sentence such as, "An armored vehicle, such as a tank, is typically powered by an engine that burns diesel fuel, which is generally stored in the vehicle's main fuel tank." In this example, the topic of the first sentence is related to "diesel fuel storage," while the topic of the second sentence is related to "diesel-powered armored vehicles."

To further continue the example, both topics may be associated with the same prevalence of the terms "diesel" and "fuel." However, the topic "diesel fuel storage" may be associated with a higher prevalence of the terms "tank" and "stored." Likewise, the topic "diesel-powered armored vehicles" may be associated with a higher prevalence of the terms "armored" and "vehicle." Furthermore, the overall prevalence of the terms "tank" and "stored" within the corpus may be greater than the prevalence of the terms "armored" and "vehicle." Accordingly, "diesel fuel storage" would be the preeminent topic within the corpus.

In various embodiments, the topics may include event topics 1202. As used herein, an event topic 1202 broadly refers to a topic associated with a particular event 1218, such as events $e_1$ 1206, $e_2$ 1208, $e_3$ 1210, $e_4$ 1212, $e_5$ 1214 through $e_n$ 1216 in the temporal sequence of events 1220 shown in FIG. 12. As likewise used herein, a temporal sequence of events 1220 broadly refers to a chronological sequence of events 1218 occurring at a certain time intervals 't' 1222. In various embodiments, the time intervals 't' 1222 occur within a defined period of time, such as a time window 'w' 1224. An event 1218, as used herein, broadly refers to an occurrence of a particular point in time. Likewise, a time window, as used herein, broadly refers to a period of time defined by a first event 1218 and a second event 1218. For example, as shown in FIG. 12, a time window 'w' 1224 may be defined by a first event $e_1$ 1206 and a second event $e_5$ 1214, separated by time intervals 't' 1222.

In certain embodiments, a time window 'w' 1224 is implemented to iteratively advance at time interval 't' 1222 to provide a sliding window 'w'+'t' 1226 within a temporal sequence of events 1220. For example, the time window 'w' 1224 shown in FIG. 12 may include events $e_1$ 1206 through $e_5$ 1214, which may be iterated by time interval 't' 1222 to include event topics $e_2$ 1208 through $e_n$ 1216. In this example, the event topics 1202 associated with event $e_1$ 1206 are no longer included in the temporal sequence of events 1220 upon the execution of sliding window 'w'+'t' 1226, but the event topics 1202 associated with event topics $e_n$ 1216 are.

In various embodiments, the prevalence of various terms within a corpus of content at certain intervals during a temporal sequence of events 1220 is generated in the form of a temporal topic model 1200. Likewise, as used herein, a temporal topic model 1200 broadly refers to a topic model extended to accommodate various temporal aspects, such as two or more events 1218. As an example, the preeminence of various topics within a temporal topic model 1200, and their respective correlation to one another, may change over time, such as topics related to the activities of one political candidate or another during the course of their respective campaigns.

In certain embodiments, a corpus of content is iteratively processed at time interval t 1222 during a temporal sequence of events 1220 to identify the relative preeminence of event topics 1202 associated with various events 1218. For example, as shown in FIG. 12, event $e_1$ 1206 includes event topics 1230, 1232, 1234, 1236 and 1238, while event $e_2$ 1208 includes event topics 1240, 1242, 1244, 1246 and 1248. Likewise, event $e_3$ 1210 includes event topics 1250, 1252, 1254, 1256 and 1258, while event $e_4$ 1212 includes event topics 1260, 1262, 1264, 1266 and 1268. As likewise shown in FIG. 12, event $e_5$ 1214 includes event topics 1270, 1272, 1274, 1276 and 1278, while event $e_n$ 1216 includes event topics 1280 through 1288.

In these embodiments, the relative preeminence of one event topic 1202 to another is determined by the relative prevalence of their associated terms within the corpus of content at that particular event 1218 in the temporal sequence of events 1220. As an example, event topic 1230 at event $e_1$ 1206 is preeminent to event topics 1232, 1234, 1236 and 1238. Likewise, event topic 1234 at event $e_2$ 1206 is preeminent to event topic 1248, which in turn is preeminent to event topics 1240, 1242 and 1246. To continue the example, event topic 1250 at event $e_3$ 1210 is preeminent to event topic 1254, which in turn is preeminent to event topics 1252, 1256 and 1258. Likewise, event topic 1254 at event $e_4$ 1212 is preeminent to event topics 1260 and 1268, both of which are preeminent to event topics 1262 and 1266. To further continue the example, event topic 1270 at event $e_5$ 1214 is preeminent to event topic 1274, which in turn is preeminent to event topics 1272, 1276 and 1278, continuing on to event topics 1280 through 1299 at event $e_n$ 1216.

In various embodiments, the number of event topics 1202 associated with each event 1218 is determined according to their event topic relevance correlation 1228. As used herein, event topic relevance correlation 1228 broadly refers to the statistical correlation of a particular event topic 1202 to other event topics 1202 within a corpus of content at the time of a particular event 1218 in a temporal sequence of events 1220. In certain embodiments, the event topic relevance correlation 1228 for a particular event topic 1202 associated with a particular event, such as $e_1$ 1206, $e_2$ 1208, $e_3$ 1210, $e_4$ 1212, $e_5$ 1214 through $e_n$ 1216, is assigned a corresponding event topic relevance correlation 1228 value, such as $r_1$, $r_2$, $r_3$, $r_4$, and $r_5$. In certain of these embodiments, the event topic relevance correlation 1228 for various event topics 1202 associated with a corresponding event 1218 is automatically determined by iteratively applying a temporal topic discovery algorithm at certain time intervals t 1222 to a corpus of content.

For example, event topics 1260 and 1264 at event $e_4$ 1212 may be respectively associated with the topics "diesel fuel storage" and "diesel-powered armored vehicles." Likewise, event topics 1270 and 1274 at event $e_5$ 1214 may also be respectively associated with the topics "diesel fuel storage" and "diesel-powered armored vehicles." In this example, event topics 1260, 1264, 1270, and 1274 may all share a set of common terms, such as "diesel," and "fuel," which respectively have an equivalent prevalence in a corpus of content at the time of event $e_4$ 1212 and $e_5$ 1214. However, event topic 1260 may have a lesser prevalence of the terms "tank" and "stored" compared to the prevalence of terms "armored" and "vehicle," which may be associated with event topic 1276. Likewise, event topic 1270 may have a greater prevalence of the terms "tank" and "stored" compared to the prevalence of the terms "armored" and "vehicle," which may be associated with event topic 1274.

Accordingly, the event topic relevance correlation value $r_1$ assigned to event topic 1270 would be higher than the event topic relevance correlation value $r_3$ assigned to event topic 1272. Consequently, at event $e_5$ 1214, the topic "diesel fuel storage," associated with event topic 1270 would have a greater event topic relevance correlation than the topic "diesel-powered armored vehicles" associated with event topic 1274. As a result, the event topic "diesel fuel storage," which was not preeminent at event $e_4$ 1212, becomes the preeminent event topic at event $e_5$ 1214. In these embodiments, the event topic relevance correlation 1228 value that qualifies a particular domain topic 1202 for association with a particular event 1218 is a matter of design choice. Skilled practitioners of the art will recognize that many such embodiments and examples are possible. Accordingly, the foregoing is not intended to limit the spirit, scope or intent of the invention.

Figure 13:
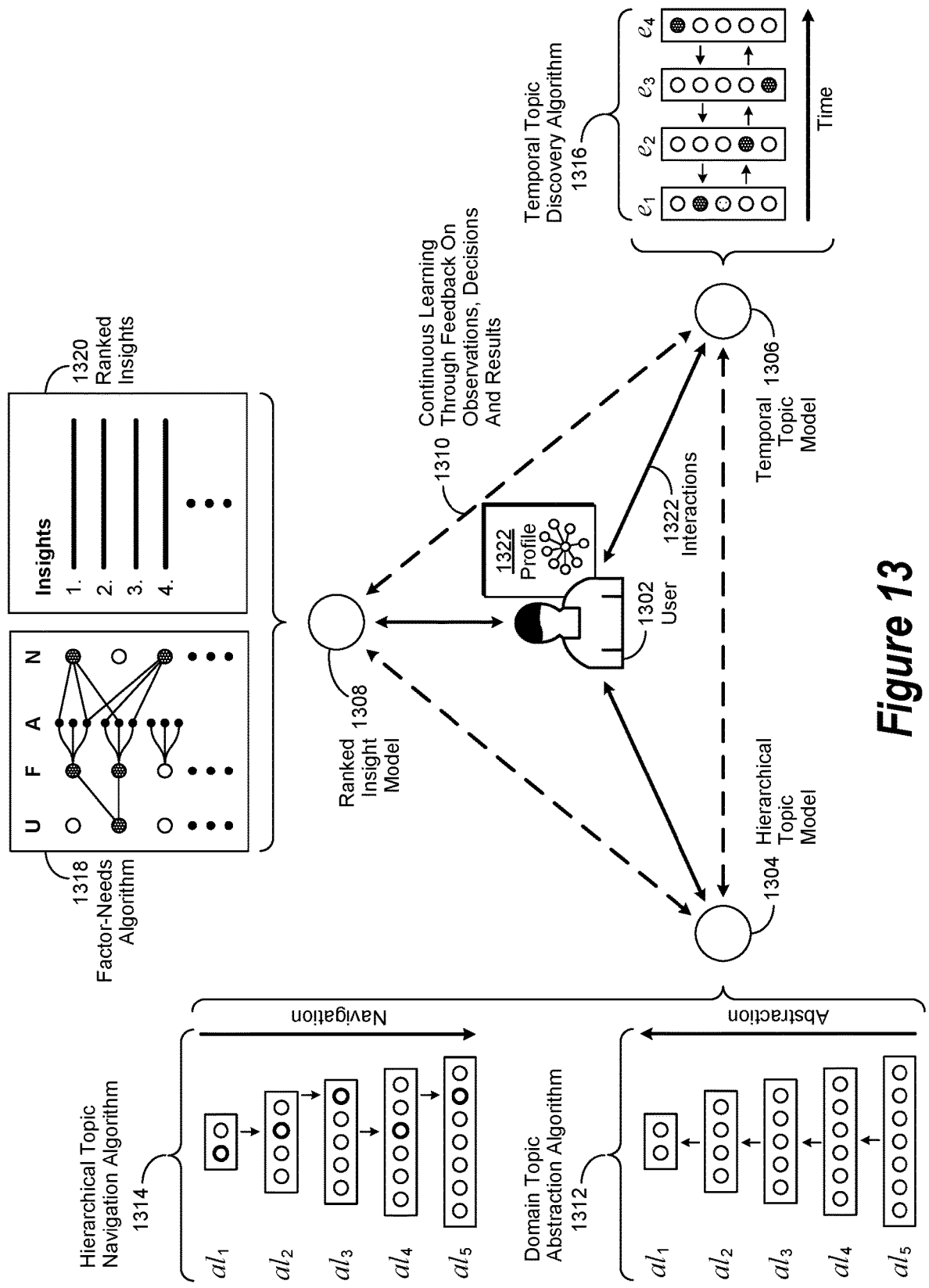
FIG. 13 is a simplified block diagram of the performance of continuous cognitive machine learning operations.

FIG. 13 is a simplified block diagram of the performance of continuous cognitive machine learning operations implemented in accordance with an embodiment of the invention. In various embodiments, a cognitive inference and learning system (CILS) is implemented to utilize a hierarchical topical 1304 model, a temporal topic 1306 model, and a ranked insight 1308 model, or some combination thereof, to perform continuous cognitive machine learning 1310 operations.

In these embodiments, feedback on observations 416, decisions 418, and results 420, described in greater detail in the descriptive text associated with FIG. 4, is used in the performance of the continuous cognitive machine learning 1310 operations. In certain embodiments, the hierarchical topical 1304 model, a temporal topic 1306 model, and a ranked insight 1308 model, or some combination thereof, are implemented to exchange data amongst themselves to perform the continuous cognitive machine learning 1310 operations. In various embodiments, the hierarchical topical 1304 model, a temporal topic 1306 model, and a ranked insight 1308 model, or some combination thereof, are implemented to interact with one another to perform the continuous cognitive machine learning 1310 operations. In certain embodiments, the continuous cognitive machine learning 1310 operations are performed to generate ranked cognitive insights 1320, likewise described in greater detail herein.

In various embodiments, the hierarchical topical 1304 model is implemented through the utilization of a domain topic abstraction 1312 algorithm and a hierarchical topic navigation 1314 algorithm. In certain embodiments, the temporal topic 1306 model is implemented through the utilization of a temporal topic discovery algorithm 1316. In various embodiments, the ranked insight 1304 model is implemented through the utilization of a factor-needs 1318 algorithm configured to perform ranking/re-ranking operations. In certain embodiments, the factor-needs algorithm 1318 is implemented to provide ranked insights 1320 to a user 1302 resulting from the performance of such ranking/re-ranking operations. In various embodiments, these algorithms may be used in various combinations to perform the continuous cognitive machine learning 1310 operations. The method by which these algorithms are used in combination is a matter of design choice. Skilled practitioners of the art will recognize that many such embodiments are possible. Accordingly, the foregoing is not intended to limit the spirit, scope or intent of the invention.

In various embodiments, a factor-needs 1320 algorithm is implemented to generate a needs graph model. In certain embodiments, the needs graph model utilizes a matrix approach to map various users 'U' 1302 to particular factors 'F', each of which have certain attributes 'A'. In turn, various attributes 'A' of each factor 'F' are mapped to certain needs 'N'. In various embodiments, an individual user 'U' 1302 may be mapped to one or more factors 'F'. Likewise, one or more attributes 'A' of a particular factor 'F' may be mapped to one or more needs 'N'.

As used in the context of a factor-needs 1318 algorithm, a factor broadly refers to an element of a corpus of content that has one or more associated attributes. As an example, a factor may be an item in a product catalog. As another example, a factor may be a document or other content element within a corpus of content, as described in greater detail herein. As yet another example, a factor may be a service offered by a service provider. As likewise used in the context of a factor-needs 1318 algorithm, an attribute broadly refers to a description, a parameter, a limitation, a quality, or a consideration associated with a factor. As an example, an item in a product catalog may have certain attributes describing its color, weight, price, uses, and other characteristics. As another example, a topic within a corpus of content may have certain attributes that are characterized by its associated terms. As yet another example, a service offered by a service provider may have attributes describing its capabilities, availability, reliability, and so forth. In various embodiments, in the context of a factor-needs 1318 algorithm, the attributes may include certain cognitive attributes, described in greater detail herein.

As likewise used in the context of the factor-needs 1318 algorithm, a need broadly refers to a requirement, desire or objective associated with a user 1302. As an example, a user 1302 may have a requirement for accommodations with disability access in a particular city on a particular date. As another example, a user 1302 may have a desire to attend a certain type of musical performance. As yet another example, a user 1302 may have an objective of completing a series of tests to be granted certification in a particular skill. Those of skill in the art will recognize that many such examples of factors, attributes and needs are possible. Accordingly, the foregoing is not intended to limit the spirit, scope or intent of the invention.

In various embodiments, the hierarchical topic navigation 1314 algorithm is implemented to generate training data. In certain embodiments, the training data is used by the factor-needs algorithm 1318 algorithm to rank, or re-rank, various cognitive insights, which are provided to the user 1302 in the form of ranked insights 1320. In one embodiment, the training data is used by the factor-needs algorithm 1310 to generate a new cognitive persona, which is then associated with the user 1302 or a class of users 1302. In another embodiment, the training data is used by the factor-needs algorithm 1310 to revise an existing cognitive persona associated with the user 1302 or a class of users 1302. In yet another embodiment, the training data is used by the factor-needs algorithm 1310 to generate a new cognitive profile 1322, described in greater detail herein, for the user 1302. In yet still another embodiment, the training data is used by the factor-needs algorithm to revise an existing cognitive profile 1322 associated with the user 1302.

In various embodiments, the training data may include feedback from observations, decisions, results, or some combination thereof. In certain embodiments, this feedback may be generated by various interactions 1322 between a user 1302 and a CILS. In one embodiment, the feedback may be generated as a result of a user 1302 submitting a query to a CILS. In another embodiment, the feedback may be generated by the provision of external input data, such as a social media post or a streaming media feed. In yet another embodiment, the feedback may be generated by the user 1302 navigating a hierarchical topic 1304 model, as described in greater detail herein. In certain embodiments, the factor-needs 1318 algorithm is implemented as an online training algorithm.

In various embodiments, continuous cognitive machine learning 1310 operations are initiated by a CILS receiving user 1302 input. In certain embodiments, the user 1302 input may include a query, a declarative statement, a menu selection within a browser, other input related to a user 1302, or some combination thereof. As an example, the user-related input may include the selection of a particular class of merchandise within a merchant's website. As another example, the user-related input may include information related to the user's 1302 location. In these embodiments, a determination is then made whether a relevant cognitive persona or cognitive profile 1322, described in greater detail herein, is available for the user 1302. If so, it is retrieved and then processed for use as additional user 1302 input. The resulting user 1302 input is then processed to determine whether a relevant hierarchical topic 1304 model, or temporal topic 1306 model, or a combination of the two, are available. If a relevant temporal topic model 1306 is available, then the factor-needs 1318 algorithm is used to process it and the user input to determine relevant events and their associated event topics, described in greater detail herein.

A determination is then made whether a relevant hierarchical topic 1304 model is available. If not, then the previously-determined relevant event topics are processed by the factor-needs 1318 algorithm to generate a ranked list 1320 of event topics insights. If a relevant hierarchical topic 1304 model was not available, then the ranked list 1320 of event topic insights is provided to the user 1302. Otherwise, the user 1302 input, the ranked list 1320 of event topic insights, and a relevant hierarchical topic 1304 model are processed with the factor-needs 1318 algorithm to determine the highest relevant level of abstraction, and its associated domain topics, within the hierarchical topic 1304 model.

However, if it was determined that a relevant temporal topic 1316 model was not available, or that a relevant hierarchical topic 1304 model was, then user 1302 input and the hierarchical topic 1304 model is processed with the factor-needs 1318 algorithm to determine the highest relevant abstraction level, and its associated domain topics, within the hierarchical topic 1304 model. The resulting highest relevant abstraction level, and its associated domain topics, is then provided to the user 1302. A determination is then made whether the user 1302 has selected one or more of the provided domain topics through an interaction 1322. If so, then the user's domain topic selection(s) is processed to generate cognitive machine learning training data.

The needs-factor 1318 algorithm is then used to process the resulting cognitive machine learning training data, user 1302 input, ranked event topics (if previously generated), and the hierarchical topic 1304 model, to determine the next lowest relevant level of abstraction, and its associated domain topics, within the hierarchical topic 1304 model. A determination is then made whether the lowest level of abstraction within the hierarchical topic 1304 model has been reached. If not, the next lowest level of abstraction within the hierarchical topic 1304 model, and its associated domain topics, is provided to the user 1302.

A determination is then made whether the user 1302 has selected one or more of the provided domain topics through a user interaction 1322. If so, then the user's domain topic selection(s) is processed to generate cognitive machine learning training data. The needs-factor 1318 algorithm is then used to process the resulting cognitive machine learning training data, user 1302 input, ranked event topics (if previously generated), and the hierarchical topic 1304 model, to determine the next lowest relevant level of abstraction, and its associated domain topics, within the hierarchical topic 1304 model. The process is then continued until the lowest level of abstraction in the hierarchical topic 1304 domain model is reached.

Once the lowest level of abstraction in the hierarchical topic 1304 model has been reached, then the factor-needs 1310 algorithm is used to rank the domain topics associated with the lowest level of abstraction within the hierarchical topic 1304 model. Thereafter, or if it was determined that the user 1302 has not selected one or more domain topics, then the previously ranked domain topics, or the originally-provided domain topics, are provided to the user as ranked insight 1320.

As an example, a shopper may need to purchase an evening gown for an upcoming event, such as fundraising gala. As a result, they may likewise have a need to find accessories that will coordinate with the gown they select. In this example, such needs are addressed through the use of a needs graph model, in which the gown, the accessories the shopper are described in terms of certain sets of needs. To continue the example, the needs associated with a given evening gown may correspond to certain of its characteristics, such as the kind and quality of material used in its construction, price points, and various design embellishments. Likewise, the same set of needs may also describe the shopper's affinity for certain evening gown designs, highly-rated or high-quality gown designers, or coordinating accessories.

One challenge of such an approach is the requirement to pre-curate various needs by domain experts. Another is the lack of user 1302 interactions 1322 to provide information necessary to validate these assumptions. In continuance of the example, a pre-curated need for a particular type of evening gown based upon the shopper's race, ethnicity, hair color, and body shape may have little correlation to the kind of evening gowns they may actually prefer. Likewise, certain evening gown designs might not normally be associated with a particular designer. Consequently, it may be advantageous to refine the concept of various needs, or augment the need vocabulary with additional needs, such that the needs graph model can gradually evolve over time based upon interactions 1322 with various users 1302, such as the shopper.

To continue the example, an online retailer may have a large corpus of content related to women's apparel and associated accessories. In this example, the corpus of content is abstracted into various hierarchical topic models 1304, which in turn are associated with various classes of users 1302. A new shopper, or user 1302, then interacts 1322 with a CILS to provide input related to their various needs to a ranked insight model 1308. In turn, a factor-needs algorithm 1318 is used to process the user 1302 input to determine the most relevant hierarchical topic model 1304, which is then provided to the user 1302.

The user 1302 then navigates the hierarchical topic model 1304, as described in greater detail herein, to gain access to various domain topics. In various embodiments, the user's 1302 interaction 1322 with the hierarchical topic model 1304 is provided to the ranked insight model 1308, where it is used as training data. In certain embodiments, the training data is in turn processed by the factor-needs algorithm 1318 to generate a list of ranked insights 1320, which is then provided to the user 1302.

To further continue the example, the user 1302 may be interested in evening gowns that are floor-length, have a sash around the waist, ruffles of the hem, and are suitable for upcoming Spring social events. As a result, the user 1302 interacts 1322 with a CILS to provide input related to their various needs to a ranked insight model 1308. In turn, the factor-needs algorithm 1318 processes the user 1302 input to determine the most relevant temporal topic model 1306, which is then provided to the user 1302.

The user 1302 then navigates the temporal topic model 1306, as described in greater detail herein, to gain access to various temporal topics, such as anticipated evening gown styles for Spring events. In various embodiments, the user's 1302 interaction 1322 with the temporal topic model 1306 is provided to the ranked insight model 1308, where it is used as training data. In certain embodiments, the training data is in turn processed by the factor-needs algorithm 1318 to generate a list of ranked insights 1320 related to the user's 1302 interest in a particular style of evening gown, which is then provided to the user 1302.

The process continues, with the user 1302 interacting 1322 with the ranked insight model 1308, the hierarchical topic model 1304, and the temporal topic model 1306 to iteratively receive a list of ranked insights 1320. In various embodiments, the process is iteratively repeated to achieve continuous learning through feedback on observations, decisions and results 1310, as described in greater detail herein. Skilled practitioners of the art will recognize that many such embodiments and examples are possible. Accordingly, the foregoing is not intended to limit the spirit, scope or intent of the invention.

FIG. 14 is a simplified block diagram of the generation of a cognitive profile (i.e., a "profile of one") from cognitive attributes implemented in accordance with an embodiment of the invention. In various embodiments, a user 1412 performs user interactions, as described in greater detail herein, with content elements '1' 1402 through 'n' 1406. In these embodiments, cognitive attributes '1' 1404 through 'n' 1408 corresponding to content elements '1' 1402 through 'n' 1406 are processed to generate a cognitive profile 1410 for the user 1412.

As an example, the user 1412 may have indicated by their user interactions with content elements '1' 1402 through 'n' 1406 that they prefer bare shoulder and sleeveless dress styles. Likewise, the user 1412 may have indicated through various user interactions that they dislike dress styles that have short or long sleeves. Accordingly, the resulting cognitive profile 1410 may be used, as described in greater detail herein, to provide more relevant cognitive insights or recommendations to the user 1412. In certain embodiments, the relevance and accuracy of such cognitive insights or recommendations improves over time as the user 1412 performs more user interactions with content elements '1' 1402 through 'n' 1406.

Figure 15:
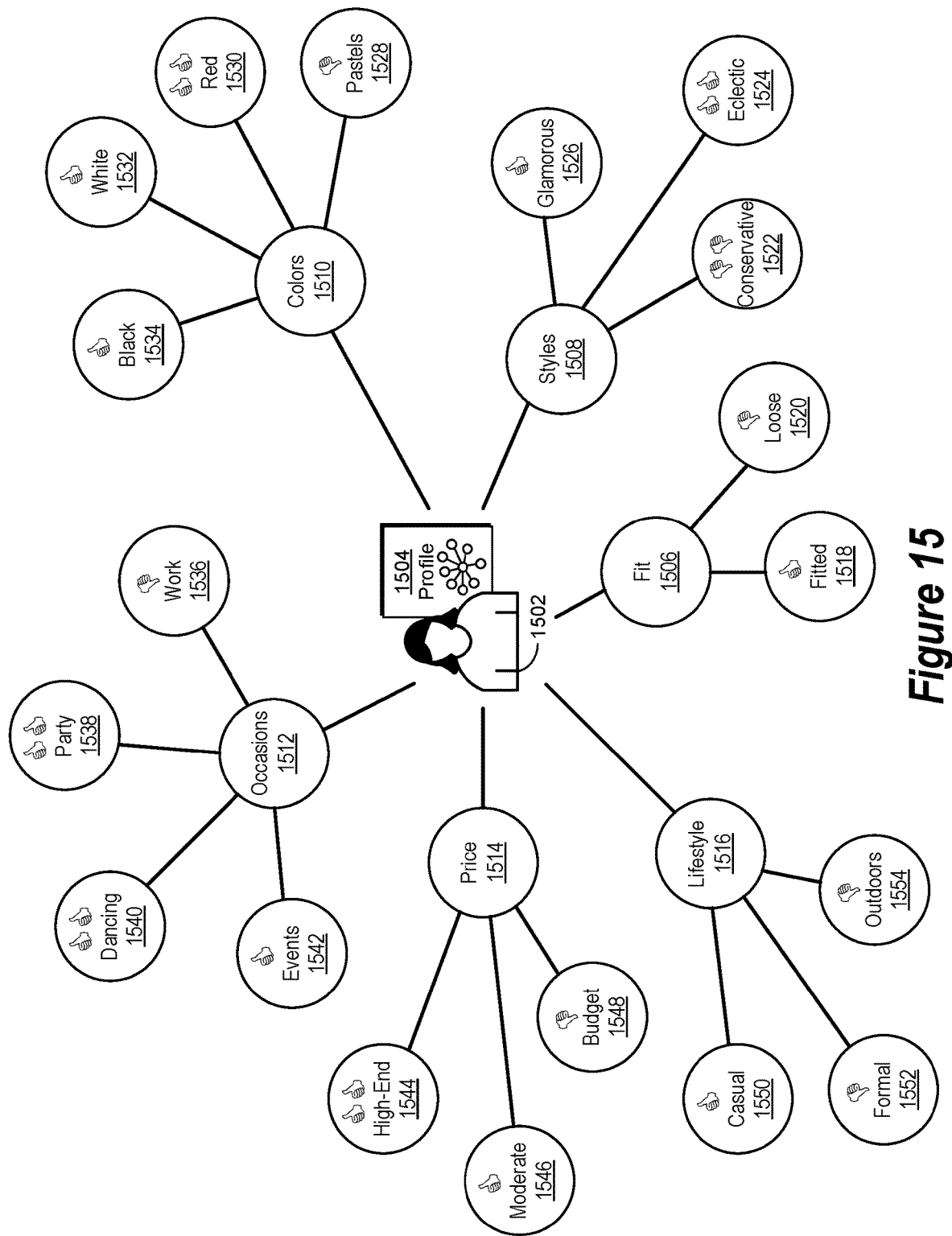
FIG. 15 depicts a cognitive profile generated from the results of a user's interactions with one or more content elements.

FIG. 15 depicts a cognitive profile generated from the results of a user's interactions with one or more content elements implemented in accordance with an embodiment of the invention. In various embodiments, a user 1502 indicates their affinity for a particular content element through an associated user interaction, described in greater detail herein. In one embodiment, the user 1502 is presented a first group of content elements within a user interface (UI). In response, the user 1502 may utilize a user gesture to select one of the proffered content elements. By doing so, the user 1502 indicates their affinity for that particular content element.

In this embodiment, the selection of a given content element from the first group of content elements results in the user 1502 being presented a second group of content elements. As before, the user 1502 may utilize a user gesture to select a favored content element, which results in the user 1502 being presented a third group of content elements. The process continues for a certain number of iterations, with the user 1502 iteratively selecting a favored content element from each group. In various embodiments, each selected content element may have certain associated cognitive attributes, which in turn are associated with a corresponding cognitive attribute class, described in greater detail herein. In certain of these embodiments, the associated cognitive attributes and their corresponding attribute classes are used to generate a cognitive profile 1504, which in turn is associated with the user 1502.

As an example, the user 1502 may have iteratively selected five different content elements, each of which is associated with women's apparel. As shown in FIG. 15, the cognitive attributes of "fitted" 1518 and "loose" 1520 are associated with the cognitive attribute class of "fit" 1506, while the cognitive attributes of "conservative" 1522, "eclectic" 1524, and "glamorous" 1526 are associated with the cognitive attribute class of "styles" 1508. Likewise, the cognitive attributes of "pastels" 1528, "red" 1530, "white" 1532, and "black" 1534 are associated with the cognitive attribute class of "colors" 1510, while the cognitive attributes of "work" 1536, "party" 1538, "dancing" 1540, and "events" 1542 are associated with the cognitive attribute class of "occasions" 1512. As likewise shown in FIG. 15, the cognitive attributes of "high-end" 1544, "moderate" 1546, and "budget" 1548 are associated with the cognitive attribute class of "price" 1514, while the cognitive attributes of "casual" 1550, "formal" 1552, and "outdoors" 1554 are associated with the cognitive attribute class of "lifestyle" 1516. In turn, the cognitive attribute classes "fit" 1506, "styles" 1508, "colors" 1510, "occasions" 1512, "price" 1514, and "lifestyle" are associated with the user's 1502 cognitive profile 1504.

In one embodiment, the cognitive attributes associated with each content element selected by the user 1502, and their corresponding attribute classes, are used to generate a cognitive profile 1504 indicating the user's 1502 affinity for certain content elements. To continue the preceding example, four of the five content elements selected by the user 1502 may have been associated with the cognitive attribute of "high-end" 1544. Likewise, one content element may have been associated with the cognitive attribute of "moderate" 1546 while none of selected content elements was associated with the cognitive attribute of "budget" 1546. Accordingly, the resulting cognitive profile 1504 may reflect the user's 1502 affinity for content elements that are associated with the cognitive attribute of "high-end" 1544 for the cognitive attribute class of "price" 1514. Accordingly, the cognitive profile 1504 can be used in various embodiments to identify and proffer additional content elements to the user 1502 that have the cognitive attribute of "high-end" 1544 for the cognitive attribute class of "price" 1514.

In another embodiment, the user 1502 is presented one or more content elements within a UI, each of which has an associated group of icons that can be selected by the user 1502 to indicate the extent of their affinity for a given content element. As an example, a "double thumbs-up" icon may represent high affinity, a "single thumbs-up" icon may represent moderate affinity, and an "empty circle" icon may represent indifference. Likewise, a "single thumbs-down" icon may represent moderate aversion and a "double thumbs-down" icon may indicate high aversion.

In this embodiment, the user's 1502 selection of a particular icon associated with each content element results in the generation of an associated cognitive profile 1504 reflecting the user's affinity for various cognitive attributes. To continue the preceding example, the user may be presented four content elements within a UI, each of which depicts a woman's dress. The first content element may show a black dress, the second a white dress, the third a red dress, and the fourth a dress in a pastel color.

In response, the user may select a "single thumbs-up" icon for the content elements showing the black dress and the white dress, a "double thumbs-up" icon for the content element showing the red dress, and a "single thumbs-down" icon for the content element showing the dress in a pastel color. As a result, a cognitive profile 1504 is generated to reflect the user's 1502 moderate affinity to the color of dresses associated with the cognitive attributes of "black" 1534 and "white" 1532. Likewise, the cognitive profile 1504 would reflect the user's 1502 high affinity to the color of dresses associated with the cognitive attribute of "red" 1530 and moderate aversion to dresses associated with the cognitive attribute of "pastels" 1528.

Accordingly, the cognitive profile 1504 can be used in various embodiments to subsequently proffer content elements depicting women's dresses to the user 1502 that are associated with the cognitive attribute of "red." In one embodiment, the user's selection of a particular icon associated with a first content element displayed within a UI results in the subsequent display of a second content element having one or more cognitive attributes in common with the first content element. In another embodiment, the user's selection of a particular icon associated with a first content element displayed within a UI results in a second content element having one or more cognitive attributes in common with the first content element not being displayed. In yet another embodiment, the iterative selection of various icons associated with each content element displayed within a UI results in the cognitive profile 1504 more accurately reflecting the user's 1502 affinity for other content elements. As a result, the cognitive profile 1504 can be implemented in various embodiments to improve the likelihood that the user has a higher affinity for a content element provided as a cognitive insight or recommendation.

Figure 16:
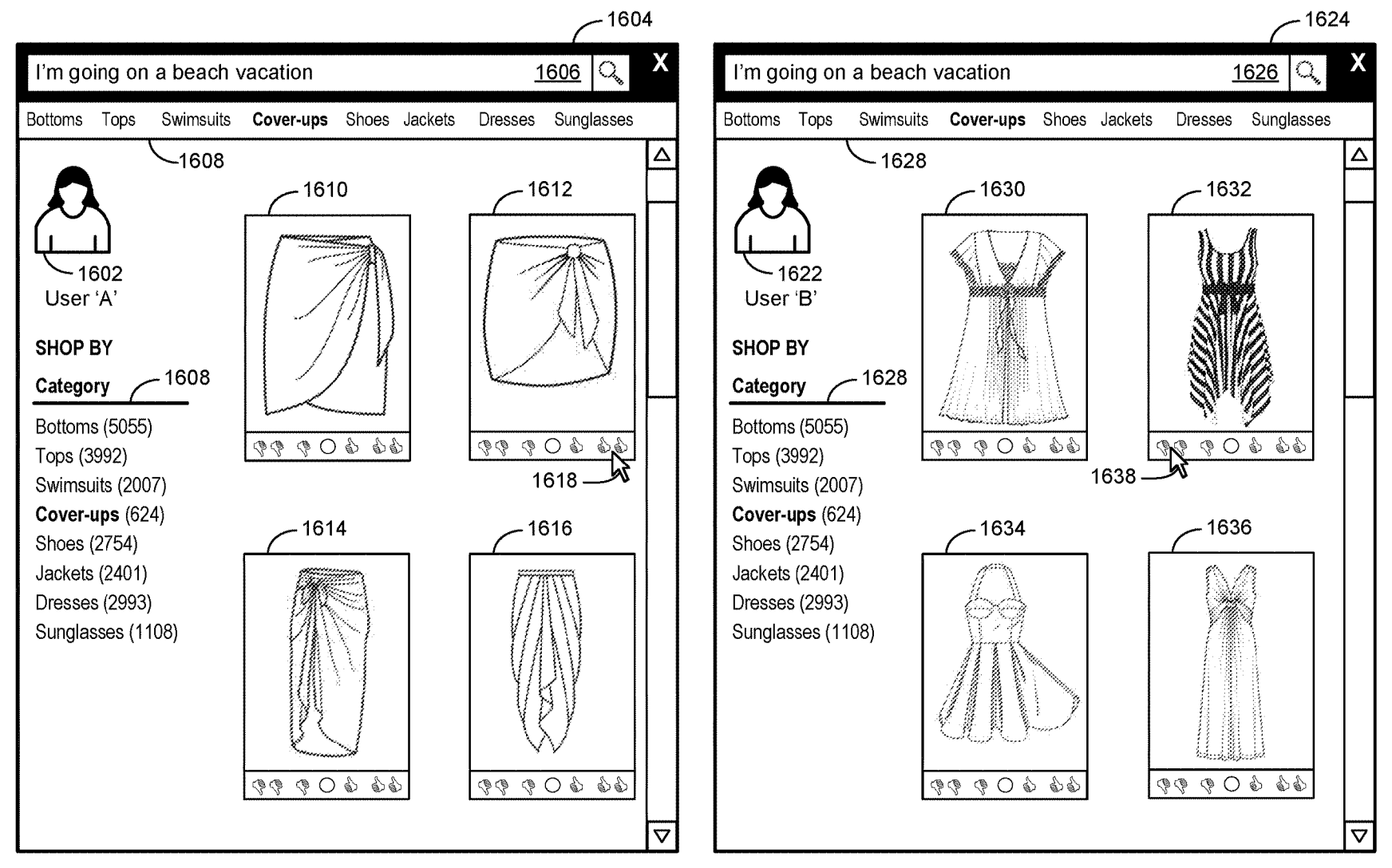

FIG. 16 shows the display of content elements pertinent to a particular user's affinities within a user interface (UI) implemented in accordance with an embodiment of the invention. In various embodiments, cognitive attributes associated with a cognitive profile corresponding to a particular user are used to identify content elements within a corpus of content that are associated with the same or similar cognitive attributes. In one embodiment, the cognitive profile is implemented in combination with a search capability to enable cognitive searching of a corpus of content. In one embodiment, the cognitive profile is implemented in combination with a browser to enable cognitive browsing of a corpus of content. In these embodiments, the cognitive searching and cognitive browsing facilitates the identification of content elements within the corpus of content that are pertinent to a particular user's affinities.

For example, as shown in FIG. 16, user 'A' 1602 and user 'B' 1622 respectively enter the same declaratory statement, "I'm going on a beach vacation" into the search windows 1606 and 1626 of UI windows 1604 and 1624. As a result, a first set of content element images 1610, 1612, 1614, and 1616 are displayed to user 'A' 1602 within UI window 1604. Likewise, a second set of content element images 1630, 1632, 1634, and 1636 are displayed to user 'B' 1622 within UI window 1624.

As another example, both user 'A' 1602 and user 'B' 1622 decide to browse a corpus of content by respectively selecting an appropriate category of women's apparel from a menu 1608 or 1628 within the UI 1604 or 1624. As before, a first set of content element images 1610, 1612, 1614, and 1616 are displayed to user 'A' 1602 within UI window 1604. Likewise, a second set of content element images 1630, 1632, 1634, and 1636 are displayed to user 'B' 1622 within UI window 1624. In both examples, cognitive attributes respectively associated with a cognitive profile corresponding to user 'A' 1602 and 'B' 1624 are used to identify content elements within a corpus of content that are associated with the same or similar cognitive attributes.

For example, as depicted in FIG. 16, content element images 1610, 1612, 1614, 1616 of lower body cover-ups are displayed in UI 1604 while content element images 1630, 1632, 1634, 1636 of upper body cover-ups are displayed in UI 1624. In various embodiments, user 'A' 1602 and 'B' 1622 can respectively indicate their affinity for certain content element images 1610, 1612, 1614, 1616, and content element images 1630, 1632, 1634, 1636, by selecting their associated icons, as described in greater detail. In certain embodiments, the associated icons are respectively selected through the utilization of a user gesture, such as a mouse click in combination with pointer 1618 within UI 1604 or pointer 1638 within UI 1624. Accordingly, the use of a cognitive profile associated with a given user, in combination with their respective user interactions with various content element images, will result in a cognitive inference and learning system (CILS) providing cognitive insights or recommendations that are increasingly pertinent to a particular user's affinities.

Figure 17A:
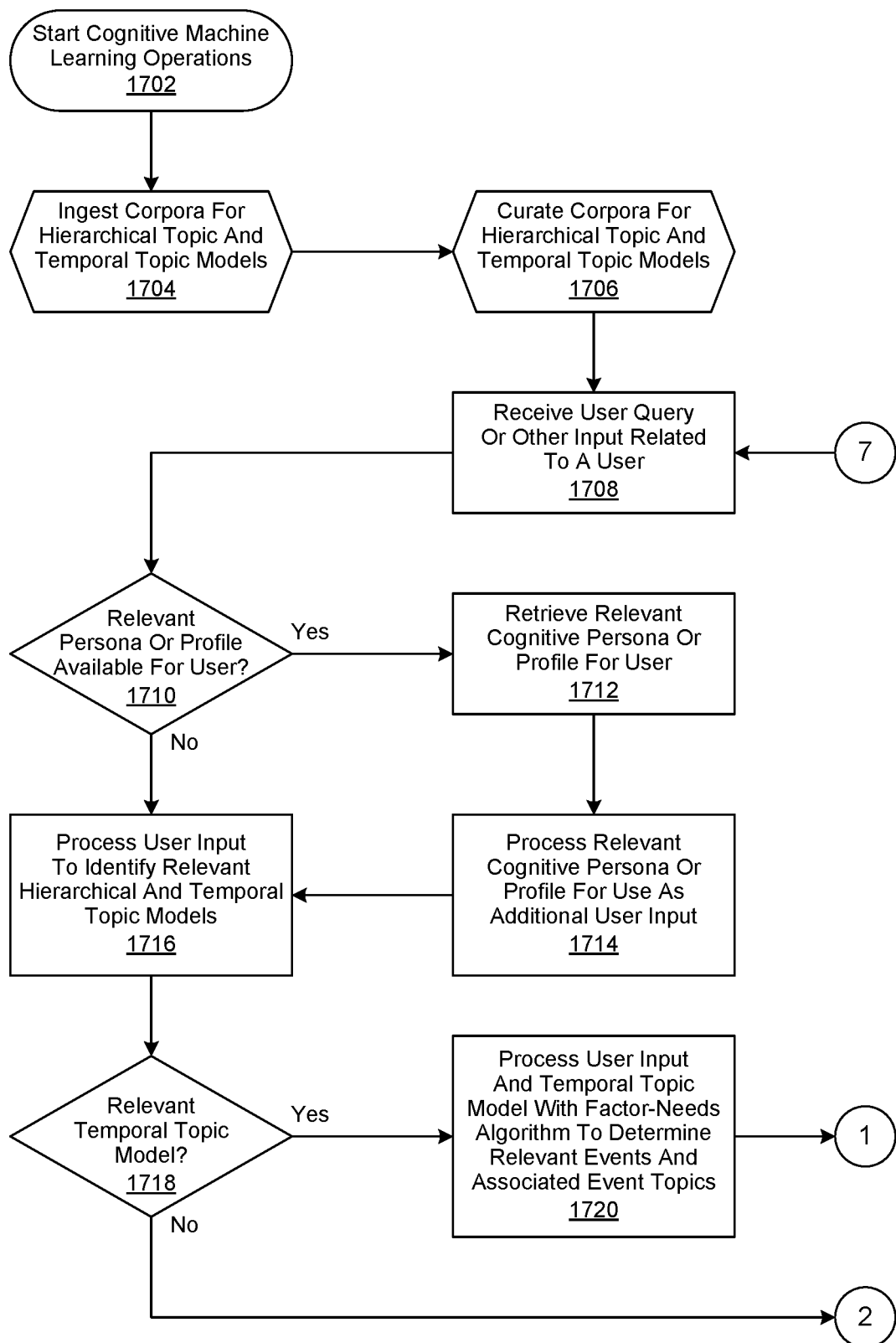
FIGS. 17a through 17c are a generalized flowchart of the performance of continuous cognitive machine learning operations.
Figure 17B:
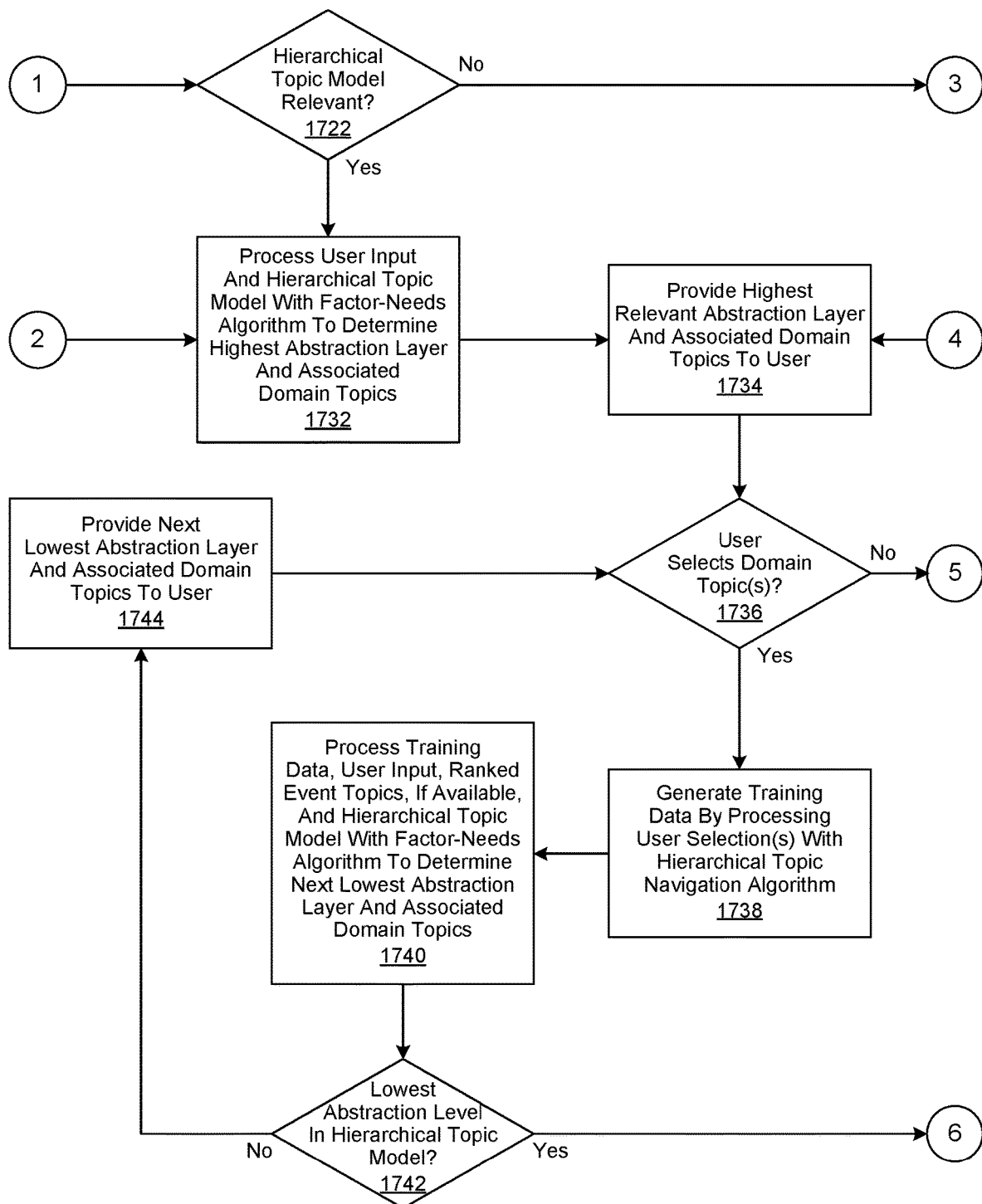
Figure 17C:
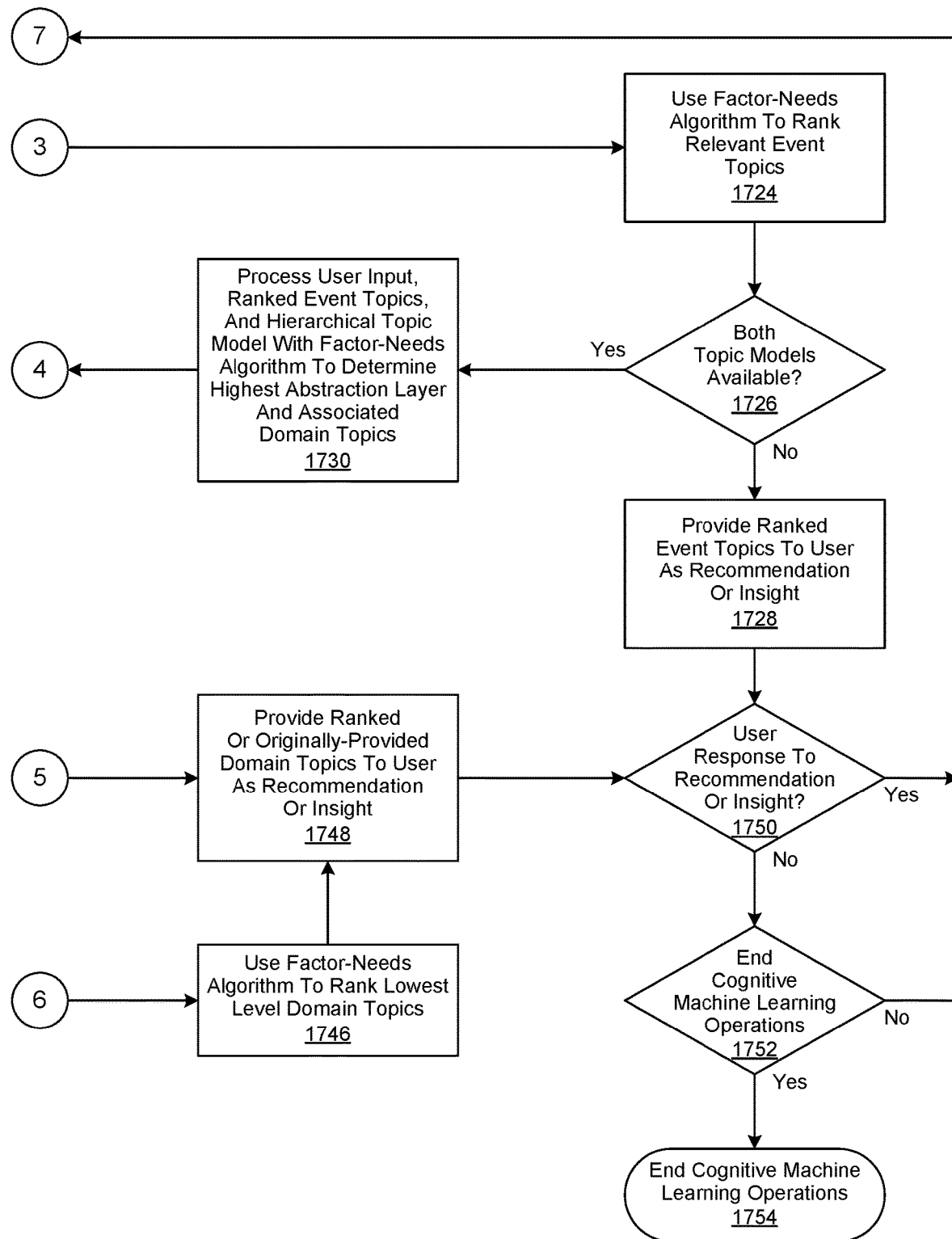

FIGS. 17a through 17c are a generalized flowchart of continuous cognitive machine learning operations performed in accordance with an embodiment of the invention. In this embodiment, continuous cognitive machine learning operations are begun in step 1702, followed by ongoing corpora ingestion and curation operations, described in greater detail herein, being performed in steps 1704 and 1706. A user query or other input related to a user is then received in step 1708, followed by a determination being made in step 1710 whether a relevant cognitive persona or cognitive profile, described in greater detail herein, is available for the user. If so, then they are retrieved in step 1712 and then processed in step 1714 for use as additional user input.

Thereafter, or if it was determined in step 1710 that a relevant cognitive persona or cognitive profile was not available, the user input is then processed in step 1716 to identify relevant hierarchical and temporal topic models. A determination is then made in step 1718 whether a relevant temporal topic model is available. If so, then user input and the temporal topic model is processed in step 1720 with a factor-needs algorithm to determine relevant events and their associated event topics.

A determination is then made in step 1722 whether a relevant hierarchical topic model is available. If not, then the relevant event topics determined in step 1720 are processed by the factor-needs algorithm in step 1724 to generate a ranked list of event topics. A determination is then made in step 1726 whether both hierarchical topic and temporal topic models are available. If not, then the ranked list of event topics is provided to the user in step 1728 as a ranked recommendation or cognitive insight. Otherwise, the user input, the ranked list of event topics, and a relevant hierarchical topic model are processed in step 1730 with a factor-needs algorithm to determine the highest relevant level of abstraction, and its associated domain topics, within the hierarchical topic model.

However, if it was respectively determined in steps 1718 and 1722 that a relevant temporal topic model was not available, or that a relevant hierarchical topic model was, then user input and the hierarchical topic model is processed in step 1732 with the factor-needs algorithm to determine the highest relevant abstraction level, and its associated domain topics, within the hierarchical topic model. The resulting highest relevant abstraction level determined in either step 1730 or step 1732, and its associated domain topics, is then provided to the user in step 1734. A determination is then made in step 1736 whether the user has selected one or more of the domain topics provided in step 1734. If so, then cognitive machine learning training data is generated in step 1738 by processing the user's domain topic selection(s) with a hierarchical topic navigation algorithm.

The factor-needs algorithm is then used in step 1740 to process the resulting cognitive machine learning training data, user input, ranked event topics, if generated in step 1724, and the hierarchical topic model, to determine the next lowest relevant level of abstraction, and its associated domain topics, within the hierarchical topic model. A determination is then made in step 1742 whether the lowest level of abstraction within the hierarchical topic model has been reached. If not, the next lowest level of abstraction within the hierarchical topic model, and its associated domain topics, is provided to the user in step 1746. The process is then continued, proceeding with step 1736.

However, if it was determined in step 1742 that the lowest level of abstraction in the hierarchical topic model has been reached, then the factor-needs algorithm is used in step 1746 to rank the domain topics associated with the lowest level of abstraction within the hierarchical topic model. Thereafter, or if it was determined in step 1736 that the user has not selected one or more domain topics, then the previously ranked domain topics, or the domain topics originally provided in step 1734, are provided to the user in step 1748 as a ranked recommendation or cognitive insight.

Thereafter, or after the ranked event topics are provided to the user as a ranked recommendation or cognitive insight in step 1728, a determination is made in step 1750 whether a response to the ranked recommendation or cognitive insight provided in steps 1728 or 1748 is received from the user. If so, then the process is continued, proceeding with step 1708. Otherwise, a determination is made in step 1752 whether to end continuous cognitive machine learning operations. If not, then the process is ended, proceeding with step 1708. Otherwise, continuous cognitive machine learning operations are ended in step 1754.

Although the present invention has been described in detail, it should be understood that various changes, substitutions and alterations can be made hereto without departing from the spirit and scope of the invention as defined by the appended claims.

What is claimed is:

1. A computer-implementable method for performing a cognitive attribution operation comprising:
   receiving content element data, the content element data representing a content element,
      the content element comprising an element of a corpus of content;
   performing a cognitive learning operation on the content element data, the cognitive learning operation identifying descriptive information associated with the content element, the cognitive learning operation generating a hierarchical abstraction of topics from the descriptive information associated with the content element, the cognitive learning operation being performed by a cognitive inference and learning system, the cognitive inference and learning system comprising a cognitive platform, the cognitive platform comprising a cognitive graph, the cognitive graph comprising an application cognitive graph, the application cognitive graph comprising a cognitive graph associated with a cognitive application, interactions between the cognitive application and the application cognitive graph being represented as a set of nodes in the cognitive graph;
   associating a cognitive attribute with the content element using the descriptive information associated with the content element; and,
   generating a cognitive insight using the attribute associated with the content element.

2. The method of claim 1, wherein:
   the content element data comprises an image data element; and,
   the cognitive learning operation comprising performing a computer vision operation on the content element data.

3. The method of claim 2, wherein:
   the computer vision operation segments portions of the image data element to provide a segmented image comprising a plurality of image segments.

4. The method of claim 3, wherein:
   the cognitive attribute is associated with at least one cognitive attribute class; and,
   an image segment of the plurality of image segments is associated with a corresponding cognitive attribute class.

5. The method of claim 2, wherein:
the content element comprises descriptive information related to the image data element; and,
the cognitive learning operation comprises performing a natural language processing operation on the descriptive information related to the image data element to generate a cognitive attribute associated with the description information.

6. The method of claim 5, wherein:
the cognitive attribute associated with the descriptive information is associated with at least one cognitive attribute class.

7. A system comprising:
a processor;
a data bus coupled to the processor; and
a non-transitory, computer-readable storage medium embodying computer program code,
the non-transitory, computer-readable storage medium being coupled to the data bus, the computer program code interacting with a plurality of computer operations and comprising instructions executable by the processor and configured for:
receiving content element data, the content element data representing a content element, the content element comprising an element of a corpus of content;
performing a cognitive learning operation on the content element data, the cognitive learning operation identifying descriptive information associated with the content element, cognitive graph, the cognitive graph being derived from the plurality of data sources, the cognitive graph comprising an application cognitive graph, the application cognitive graph comprising a cognitive graph associated with a cognitive application, interactions between the cognitive application and the application cognitive graph being represented as a set of nodes in the cognitive graph;
associating a cognitive attribute with the content element using the descriptive information associated with the content element; and,
generating a cognitive insight using the attribute associated with the content element.

8. The system of claim 7, wherein:
the content element data comprises an image data element; and,
the cognitive learning operation comprising performing a computer vision operation on the content element data.

9. The system of claim 8, wherein:
the computer vision operation segments portions of the image data element to provide a segmented image comprising a plurality of image segments.

10. The system of claim 9, wherein:
the cognitive attribute is associated with at least one cognitive attribute class; and,
an image segment of the plurality of image segments is associated with a corresponding cognitive attribute class.

11. The system of claim 8, wherein:
the content element comprises descriptive information related to the image data element; and,
the cognitive learning operation comprises performing a natural language processing operation on the descriptive information related to the image data element to generate a cognitive attribute associated with the description information.

12. The system of claim 11, wherein:
the cognitive attribute associated with the descriptive information is associated with at least one cognitive attribute class.

13. A non-transitory, computer-readable storage medium embodying computer program code, the computer program code comprising computer executable instructions configured for:
receiving content element data, the content element data representing a content element,
the content element comprising an element of a corpus of content;
performing a cognitive learning operation on the content element data, the cognitive learning operation identifying descriptive information associated with the content element, the cognitive learning operation generating a hierarchical abstraction of topics from the descriptive information associated with the content element, the cognitive learning operation being performed by a cognitive inference and learning system, the cognitive inference and learning system comprising a cognitive platform, the cognitive platform comprising a cognitive graph, the cognitive graph comprising an application cognitive graph, the application cognitive graph comprising a cognitive graph associated with a cognitive application, interactions between the cognitive application and the application cognitive graph being represented as a set of nodes in the cognitive graph;
associating a cognitive attribute with the content element using the descriptive information associated with the content element; and,
generating a cognitive insight using the attribute associated with the content element.

14. The non-transitory, computer-readable storage medium of claim 13, wherein:
the content element data comprises an image data element; and,
the cognitive learning operation comprising performing a computer vision operation on the content element data.

15. The non-transitory, computer-readable storage medium of claim 14, wherein:
the computer vision operation segments portions of the image data element to provide a segmented image comprising a plurality of image segments.

16. The non-transitory, computer-readable storage medium of claim 15, wherein:
the cognitive attribute is associated with at least one cognitive attribute class; and,
an image segment of the plurality of image segments is associated with a corresponding cognitive attribute class.

17. The non-transitory, computer-readable storage medium of claim 14, wherein:
the content element comprises descriptive information related to the image data element; and,
the cognitive learning operation comprises performing a natural language processing operation on the descriptive information related to the image data element to generate a cognitive attribute associated with the description information.

18. The non-transitory, computer-readable storage medium of claim 17, wherein:
the cognitive attribute associated with the descriptive information is associated with at least one cognitive attribute class.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

\* \* \* \* \*